US012699167B2

(12) United States Patent
La et al.

(10) Patent No.: US 12,699,167 B2
(45) Date of Patent: Aug. 4, 2026

(54) MULTI-CHANNEL COHERENT LiDAR APPARATUS

(71) Applicant: Lambda innoVision Inc., Hwaseong-si (KR)

(72) Inventors: Jong Pil La, Hwaseong-si (KR); Ji Eun Choi, Hwaseong-si (KR)

(73) Assignee: Lambda inno Vision Inc., Hwaseong-si (KR)

( * ) Notice: Subject to any disclaimer, the term of this patent is extended or adjusted under 35 U.S.C. 154(b) by 302 days.

(21) Appl. No.: 18/616,309

(22) Filed: Mar. 26, 2024

(65) Prior Publication Data

US 2025/0093480 A1     Mar. 20, 2025

(30) Foreign Application Priority Data

Sep. 20, 2023     (KR) ........................ 10-2023-0125317
Nov. 20, 2023     (KR) ........................ 10-2023-0160228

(51) Int. Cl.
*G01C 3/08*          (2006.01)
*G01S 7/4912*       (2020.01)
(Continued)

(52) U.S. Cl.
CPC .......... *G01S 7/4917* (2013.01); *G01S 7/4913* (2013.01); *G01S 17/32* (2013.01)

(58) Field of Classification Search
CPC ...... G01S 7/4917; G01S 7/4913; G01S 17/32; G01S 17/34; G01S 7/282; G01S 7/285;
(Continued)

(56)     References Cited

U.S. PATENT DOCUMENTS

| 9,658,052 B2 * | 5/2017 | Jia ........................ G02F 1/0115 |
| 10,663,587 B1 * | 5/2020 | Sandborn ................ G01S 7/491 |
| 2022/0221557 A1 | 7/2022 | Yeh et al. |

FOREIGN PATENT DOCUMENTS

| JP | H1076705 A | 3/1998 |
| KR | 102002387 B1 | 7/2019 |

(Continued)

OTHER PUBLICATIONS

Korean Office Action of KR 10-2023-0160228 issued Feb. 29, 2024.

*Primary Examiner* — Samantha K Nickerson
(74) *Attorney, Agent, or Firm* — Dinsmore & Shohl LLP; Yongsok Choi, Esq.

(57)     ABSTRACT

Disclosed is a multi-channel coherent LiDAR apparatus. The LiDAR apparatus includes a plurality of analog-to-digital converts (ADCs) each configured to receive reflected light reflected by a target and to convert the reflected light into a digital signal, one or more modulation units configured to receive the digital signals that have passed through some or all of the ADCs and channel signals having different frequencies or types and to modulate the digital signals, an adder configured to integrate the signals that have been modulated and received from the modulation units, a fast Fourier transform (FFT) unit configured to convert one signal integrated by the adder into a signal in a frequency domain, and a detection unit configured to detect the information on the distance of the target based on the signal converted into the signal in the frequency domain through the FFT unit.

5 Claims, 17 Drawing Sheets

100

(51) Int. Cl.
*G01S 7/4913* (2020.01)
*G01S 17/32* (2020.01)

(58) Field of Classification Search
CPC . G01S 7/42; G01S 13/00; G01S 13/12; G01S
13/42; G01S 13/95; G01S 7/00; G01S
7/292
See application file for complete search history.

(56) References Cited

FOREIGN PATENT DOCUMENTS

| | | | |
|---|---|---|---|
| KR | 1020230017129 A | 2/2023 |
| KR | 1020230054299 A | 4/2023 |
| WO | 2016163027 A1 | 10/2016 |

* cited by examiner

2100

MULTI-CHANNEL COHERENT LiDAR APPARATUS

CROSS-REFERENCE TO RELATED APPLICATIONS

The present application claims priority under 35 U.S.C. § 119 (a) to Korean Patent Application Nos. 10-2023-0125317 and 10-2023-0125349, filed in the Korean Intellectual Property Office on Sep. 20, 2023 and Korean Patent Application No. 10-2023-0160228, filed in the Korean Intellectual Property Office on Nov. 20, 2023, the entire disclosures of which are incorporated herein by reference.

These patents are the results of research that was carried out by the support (a unique project number: 1415187768, a detailed project number: 20024096, a project name: The development of volume 300 cc less-Solid State FMCW LiDAR for an autonomous robot for handling a poor indoor and outdoor driving environment (e.g., snow, smoke, or dust)) of the Korea Planning & Evaluation Institute of Industrial Technology by the finances of the government of the Republic of Korea (The Ministry of Trade, Industry and Energy) in 2023.

BACKGROUND

1. Technical Field

The present embodiment relates to a multi-channel coherent LiDAR apparatus which significantly reduces a computational load in a process of detecting a target.

2. Related Art

Contents described in this part merely provide background information of the present embodiment, and do not constitute a conventional technology.

Light Detection And Ranging (LiDAR) is a technology for detecting an object by using light and measuring a distance up to the object, and has been developed in a form in which topography data for constructing three-dimensional geographic information system (GIS) information are constructed and visualized and thus has been used in fields, such as construction and defense.

Recently, LiDAR has been in the spotlight as a core technology as LiDAR is applied to autonomous vehicles, mobile robots, and drones. If LiDAR is applied to an (autonomous driving) vehicle, LiDAR enables a vehicle that is being driven to measure the presence of another object or another vehicle and a distance up to another object or another vehicle.

A conventional LiDAR apparatus has detected a target by radiating a pulse and sensing reflected light that is reflected by the target. If a pulse is radiated, however, there is a difficulty in sensing a target at a long distance because it becomes difficult to sense reflected light that is reflected at the long distance. Furthermore, if the target is a human being, a LiDAR apparatus that radiates the pulse may pose a deadly threat to eye health if the pulse is incident on an eyeball. If a plurality of LiDAR apparatuses is present, there is a problem in that pieces of light that are radiated by the different apparatuses interfere with each other.

A LiDAR apparatus that has emerged due to such a problem is a frequency modulated continuous wave (FMCW) LiDAR apparatus. The FMCW LiDAR apparatus radiates, to a target, light having an oscillation frequency linearly changed over time, and senses a distance up to the target by sensing light that is reflected by the target and then incident thereon. The reflected light has a frequency having time delay depending on the distance. The FMCW LiDAR apparatus senses the location of a target by measuring a difference between the frequencies of transmitted light and received light.

In general, such an FMCW LiDAR apparatus performs sensing by using a plurality of channels in order to sense various targets at various locations simultaneously or sequentially. The conventional FMCW LiDAR apparatus senses the location of a target by analyzing reflected light that has been received with respect to each of the plurality of channels, and has a very great computational load in a process of analyzing the received reflected light, in particular, a process of converting the received reflected light into light in a frequency domain (i.e., fast Fourier transform (FFT)). Accordingly, the conventional FMCW LiDAR apparatus including the plurality of channels has a difficulty in fast calculation and consumes a lot of power, and has to include an additional expensive component for fast calculation.

SUMMARY

An embodiment of the present disclosure is directed to providing an FMCW LiDAR apparatus in which multiple optical waveguides such as optical fibers are arranged in one direction so that multiple lights are radiated and multiple lights reflected off targets are condensed, which has high laser scan efficiency and can also be implemented at a low price.

An embodiment of the present disclosure is directed to providing an FMCW LiDAR apparatus having a generally significantly reduced size and manufacturing cost by reducing the size of the construction of a signal generator and reducing the manufacturing cost.

An embodiment of the present disclosure is directed to providing an FMCW LiDAR apparatus having significantly improved performance by minimizing an influence attributable to noise.

Furthermore, an embodiment of the present disclosure is directed to providing an FMCW LiDAR apparatus which significantly reduces a computational load in a process of detecting a target and an operating method thereof.

According to an aspect of the present embodiment, a LiDAR apparatus which includes a plurality of channels and measures information on a distance of a target by receiving light reflected by the target after radiating light to the target includes a plurality of analog-to-digital converts (ADCs) each configured to receive the reflected light reflected by the target and to convert the reflected target signal into a digital signal, one or more modulation units configured to receive the digital signals that have passed through some or all of the ADCs and channel signals having different frequencies or types and to modulate the digital signals, an adder configured to integrate the signals that have been modulated and received from the modulation units, a fast Fourier transform (FFT) unit configured to convert one signal integrated by the adder into a signal in a frequency domain, and a detection unit configured to detect the information on the distance of the target based on the signal converted into the signal in the frequency domain through the FFT unit.

According to an aspect of the present embodiment, the ADC is included to have a number corresponding to the number of channels included in the LiDAR apparatus.

According to an aspect of the present embodiment, the modulation units are included to have a number identical with the number of ADCs or are included to have a number that is one less than the number of ADCs.

According to an aspect of the present embodiment, the modulation unit performs amplitude modulation on the digitally acquired target reflected signals.

According to an aspect of the present embodiment, a method of a LiDAR apparatus including a plurality of channels operating in order to measure information on a distance of a target by receiving light reflected by the target after radiating light to the target includes a first conversion process of converting, into a digital signal, reflected light that is applied for each channel, a modulation process of receiving the digital signals that have undergone the first conversion process and channel signals having different frequencies or types and modulating the digital signals, an integration process of receiving and integrating the signals modulated in the modulation process, a second conversion process of converting one signal that has been integrated in the integration process into a signal in a frequency domain, and a detection process of detecting the information on the distance of the target based on the signal converted into the signal in the frequency domain through the second conversion process.

According to an aspect of the present embodiment, the modulation process includes performing amplitude modulation on the digital signals.

According to an aspect of the present embodiment, the first conversion process is performed in parallel by the number of channels included in the LiDAR apparatus.

As described above, according to an aspect of the present embodiment, it is possible to very quickly obtain a three-dimensional image of a target because high-speed scan is possible.

According to an aspect of the present embodiment, there are advantages in that size of the FMCW LiDAR apparatus and a manufacturing cost therefor can be reduced significantly by reducing the size of the construction of the signal generator and the manufacturing cost.

Furthermore, according to an aspect of the present embodiment, it is possible to significantly improve performance by minimizing an influence attributable to noise.

Furthermore, according to an aspect of the present embodiment, it is possible to reduce power consumption and costs by significantly reducing a computational load in a process of detecting a target.

DETAILED DESCRIPTION

Figure 1:
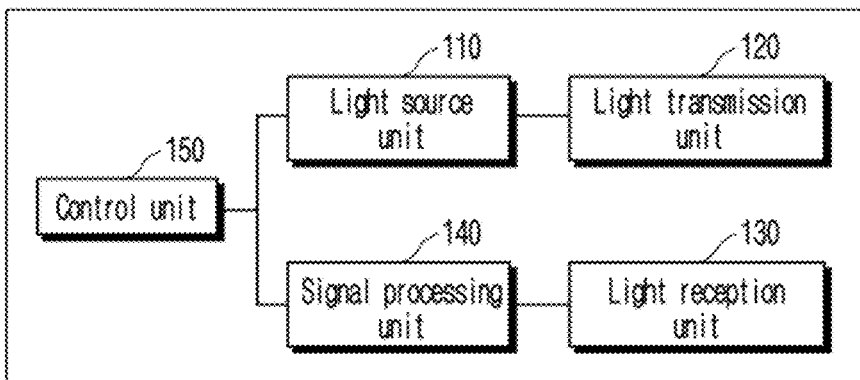
FIG. 1 is a diagram illustrating a construction of an FMCW LiDAR apparatus according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, a, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, term, such as "include" or "have", is intended to designate the presence of a characteristic, a number, a step, an operation, a component, a part of a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

Figure 2:
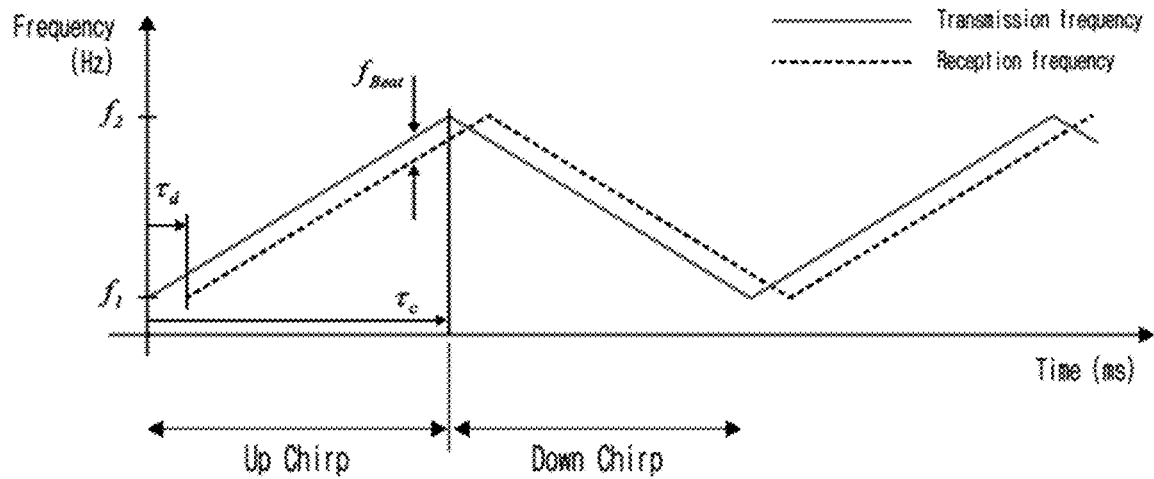
FIG. 2 is a graph illustrating the characteristics of a change in the frequency of light for each time, which is output by the FMCW LiDAR apparatus.

FIG. 1 is a diagram illustrating a construction of an FMCW LiDAR apparatus according to an embodiment of the present disclosure. FIG. 2 is a graph illustrating the characteristics of a change in the frequency of light for each time, which is output by the FMCW LiDAR apparatus.

Referring to FIG. 1, an FMCW LiDAR apparatus 100 according to an embodiment of the present disclosure includes a light source unit 110, a light transmission unit 120, a light reception unit 130, a signal processing unit 140, and a control unit 150.

The light source unit 110 outputs light for detecting a target by receiving a current, but linearly changes a frequency characteristic of the light for each time, which is output by removing phase noise from the light. As will be described with reference to FIG. 3, the light source unit 110 does not include only a light source, but further includes a stabilization unit for removing phase noise included in light that is output by the light source and adjusting the frequency characteristic of the light. Accordingly, the light source unit 110 may output light having an ideal form as much as possible.

The light having an ideal form, which is made to oscillate by the light source unit 110, has characteristics illustrated in FIG. 2.

The light that is output by the light source unit 110 has the following characteristics of a transmission frequency for each time. The frequency of the light has a characteristic in which the frequency linearly changes between a first frequency (f1) and a second frequency (f2) over time. In this case, a change cycle ($2\tau c$), the first frequency, and the second frequency of the light are design values. Accordingly, frequency change slope ($\kappa$) of the oscillating light is calculated as follows. The oscillating light may be defined as the following equation.

$$\kappa = \frac{f_2 - f_1}{\tau_c}, f_{TX}(t) = f_1 + \kappa t$$

After the light having such a frequency characteristic for each time is output, reflected light that is reflected by the target has the same characteristic as the frequency characteristic of the output light for each time, but has a frequency characteristic in which the frequency has been delayed by a preset time ($\tau d$) on a time axis. Accordingly, the reflected light may be defined as the following equation.

$$f_{RX}(t) = f_{TX}(t - \tau_d) = f_1 + \kappa(t - \tau_d)$$

Accordingly, the light that is output by the light source unit 110 needs to have the frequency characteristic illustrated in FIG. 2. If the light has such a frequency characteristic, the light that oscillates regardless of time and the reflected light have a frequency difference (fbeat) corresponding to a preset numerical value.

$$f_{TX}(t) - f_{RX}(t) = f_{Beat} = \kappa \times \tau_d$$

$$R = \frac{c}{2\kappa} \times f_{Beat}$$

In this case, R means a distance between the LiDAR apparatus and the target. c means the speed of the light. Since the frequency change slope and the speed of the light are known information, the LiDAR apparatus may detect a distance up to the target by detecting a difference between the frequencies of the output light and of the reflected light.

In order to satisfy the aforementioned equation, the frequency characteristic of the output light for each time, which has an ideal form, needs to linearly change. However, the light that is output by a light source within the light source unit 110 may inevitably include phase noise and a structural error.

In order to solve such a problem, the light source unit 110 includes the stabilization unit along with the light source so that the frequency characteristic of light for each time that is output by the light source linearly changes by removing phase noise and a structural error from the light. A detailed structure of the light source unit will be described later with reference to FIG. 3.

The light transmission unit 120 transmits light, which is output by the light source unit 110, to a detection area to be detected by the FMCW LiDAR apparatus 100. The light transmission unit 120 includes optical components for receiving light and dispersing or scanning the light to a detection area after adjusting the path of the light. The light transmission unit 120 receives light that is output by the light source unit 110, and transmits the light to a detection area by scanning or reflecting the light. The light transmission unit 120 may transmit the light by dispersing the light to the detection area in a lump, or may transmit the light in a form in which the light scans a corresponding area.

After the light transmission unit 120 transmits the light to the detection area, the light reception unit 130 receives reflected light that is reflected by the target. The light reception unit 130 includes optical components for receiving and focusing light or inputting reflected light to the signal processing unit 140 after adjusting the path of the light. The light reception unit 130 receives reflected light that is reflected by the detection area and transmits the reflected light to the signal processing unit 140.

The signal processing unit 140 receives the reflected light from the detection area, more specifically, the reflected light that is reflected by the target, and calculates a distance between the FMCW LiDAR apparatus 100 and the target. The distance between the FMCW LiDAR apparatus 100 and the target may be simply calculated by the aforementioned equation. Accordingly, the signal processing unit 140 calculates the distance between the FMCW LiDAR apparatus 100 and the target by detecting a difference between the frequencies of the output light and the reflected light.

The control unit 150 controls an operation of each of the components within the FMCW LiDAR apparatus 100.

Figure 3:
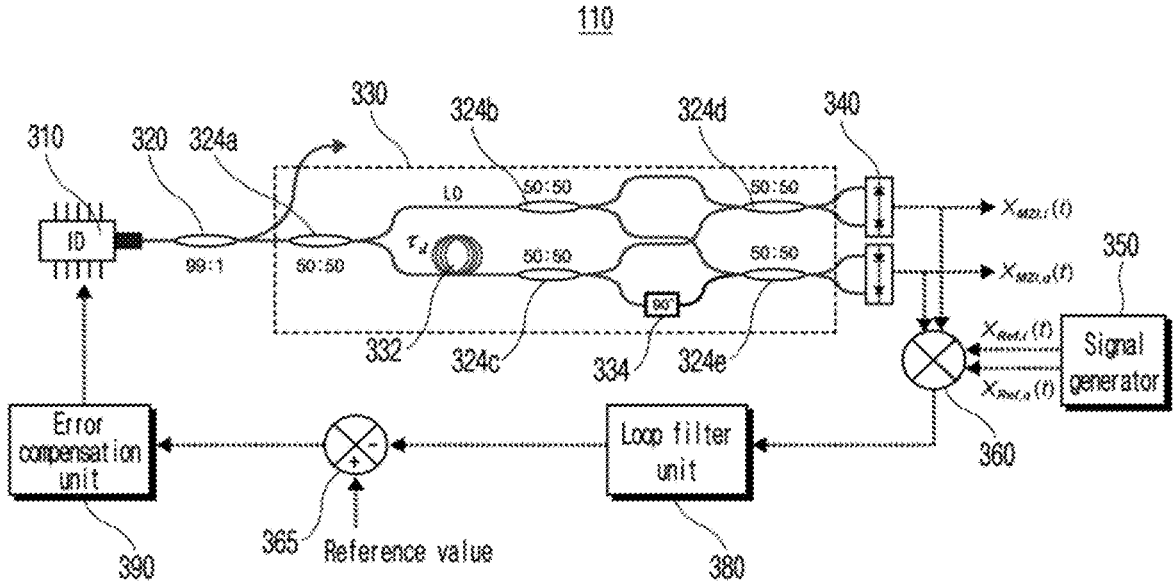
FIG. 3 is a diagram illustrating a construction of a light source unit according to an embodiment of the present disclosure.

FIG. 3 is a diagram illustrating a construction of the light source unit according to an embodiment of the present disclosure.

Referring to FIG. 3, the light source unit 110 according to an embodiment of the present disclosure includes a light source (LD) (or a light source driving circuit) 310 and a stabilization unit (not illustrated). The stabilization unit (not illustrated) includes distributors 320 and 324, an interferometer 330, a phase delayer 334, a light reception unit 340, a signal generator 350, a mixer 360, a loop filter unit 380, and an error compensation unit 390. Furthermore, the FMCW LiDAR apparatus 100 may further include a calculator 365.

The light source 310 outputs light for detecting a target by receiving a current. The light source 310 may be implemented as a single frequency laser diode (SFL) or a narrow spectral line width laser diode.

The light source 310 may output narrow band light having long coherent length in order to maintain coherent characteristic.

The coherent characteristic of the light means that the frequency and waveform of two pieces of light have the same state. The better the coherent characteristic, the more the interference phenomenon occurs. A coherent LiDAR apparatus can solve problems with the existing LiDAR apparatus, such as misdetection attributable to sunlight, a mutual interference problem between laser signals, or a risk to the eye. The coherent LiDAR apparatus needs to include a light source that makes narrow band light oscillate and a complex signal interferometer in order to have the aforementioned characteristic.

Detailed structures of the light source 310 and a driving circuit thereof will be described later with reference to FIGS. 9 to 11.

The light source 310 outputs light, but the light that is output by the light source 310 inevitably includes phase noise and a structural error. Accordingly, the stabilization unit (not illustrated) removes the phase noise and the structural error so that the frequency characteristic of the light for each time, which is output by the light source 310, linearly changes.

The distributor 320 distributes light that is output by the light source 310 into light for an operation (i.e., detecting a target) of the FMCW LiDAR apparatus 100 and light for frequency modulation linearization. The distributor 320 may distribute the light for the operation of the LiDAR apparatus at a preset ratio, for example, 90% or more compared to the light for the frequency modulation linearization. The light that has been distributed by the distributor 320 may be branched into a separate component (not illustrated) for detection within the LiDAR apparatus and radiated to the outside.

The light for the frequency modulation linearization, which has been branched from the distributor 320, is applied to the interferometer 330. The interferometer 330 performs time delay or phase delay on the applied light, and makes light that has not been delayed and light that has been subjected to time delay and/phase delay interfere with each other.

The distributor 324a distributes the light, which is applied to the interferometer 330, into two pieces of light at a ratio of 50:50. Any one of the two pieces of light distributed by the distributor 324a is applied to the distributor 324b without separate delay. In contrast, the other of the two pieces of light distributed by the distributor 324a is delayed through an optical fiber delay line 332 by a preset time (td) and then applied to the distributor 324c. The light that has been delayed by the preset time (td) through the optical fiber delay line 332 may be light corresponding to reflected light that is reflected by a target at a predetermined distance and that is delayed by a preset time in a processing process for frequency modulation linearization.

The light that has not been subjected to time delay and the light that has been subjected to time delay, through the distributor 324a, are incident on the distributors 324b and 324c, respectively, each of which branches light applied thereto into two pieces of light at a ratio of 50:50. Light that has not been subjected to time delay through each of the distributors 324b and 324c is branched into two pieces of light A and B. Light that has been subjected to time delay through each of the distributors 324b and 324c is branched into two pieces of light C and D. In this case, the phase of any one of the two pieces of light that have been branched and subjected to time delay through the distributor 324c is delayed by 90° through the phase delayer 334. That is, the light that is incident on the interferometer 330 is distributed as the two pieces of light A and B that have not been subjected to time delay, the one piece of light C that has been subjected to time delay, but has not been subjected to phase delay, and the one piece of light D that has been subjected to both time delay and phase delay. One of the two piece of light (i.e., any one of the two pieces of light A and B) that have not been subjected to time delay and the light C that has been subjected to time delay, but has not been subjected to phase delay are incident on the distributor 324d, and interfere with each other. The other of the two piece of light (i.e., the other of the two pieces of light A and B) that have not been subjected to time delay and the light D that has been subjected to both time delay and phase delay are incident on the distributor 324e, and interfere with each other.

The two pieces of light that are made to interfere with each other in the interferometer 330 appear as follows.

$$x_{MZI,i}(t) = \cos(\kappa \tau_d t + \phi_N(t))$$

$$x_{MZI,q}(t) = \sin(\kappa \tau_d t + \phi_N(t))$$

In this case, xMZI,i(t) (hereinafter denoted as "first interference light") means interference light of one piece of light that has not been subjected to time delay and light that has been subjected to time delay and that has not been subjected to phase delay. XMZI,q(t) (hereinafter denoted as "second interference light") means interference light of one piece of light that has not been subjected to time delay and light that has been subjected to both time delay and phase delay. I means amplitude of the interference light. ON (t) means phase noise that has occurred.

The light reception unit 340 senses the first interference light and the second interference light as a first interference signal (i.e., a current signal) and a second interference signal (i.e., a current signal), respectively.

The signal generator 350 generates the first interference light (xRef,i(t)) and the second interference light (xRef,q(t)), which are ideal when phase noise does not occur, as current signals (hereinafter denoted as a "first reference signal" and a "second reference signal"). The first reference signal and the second reference signal that are generated by the signal generator 350 appear as follows, and have a characteristic illustrated in FIG. 5.

$$x_{Ref,i}(t) = \cos(\kappa \tau_d t)$$

$$x_{Ref,q}(t) = \sin(\kappa \tau_d t)$$

Figure 5:
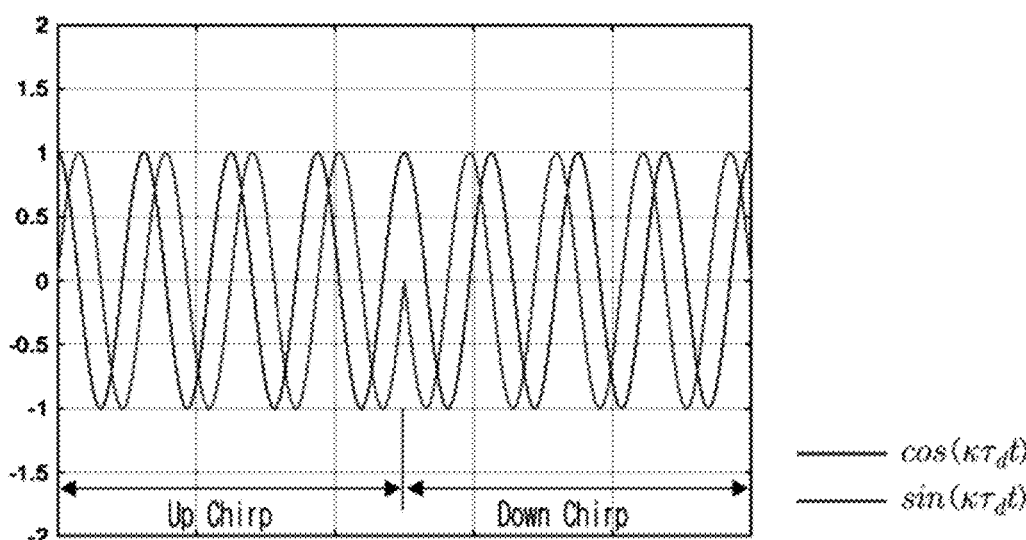
FIG. 5 is a graph illustrating the characteristics of a signal that needs to be generated by a signal generator within the FMCW LiDAR apparatus.

FIG. 5 is a graph illustrating the characteristics of a signal that needs to be generated by the signal generator within the FMCW LiDAR apparatus.

Referring to FIG. 5, the first reference signal and the second reference signal each have an up-chirp interval and a down-chirp interval like the first interference signal and the second interference signal. In the up-chirp interval, the phase of any one of the first reference signal and the second reference signal is ahead of the phase of the other thereof. In the down-chirp interval, the phase of the other of the first reference signal and the second reference signal is ahead of the phase of one thereof. The signal generator 350 has the construction of FIG. 5 to be described later, and thus may generate the first reference signal and the second reference signal in an analog way and also fully implement even the up-chirp interval and the down-chirp interval.

Referring back to FIG. 3, the mixer 360 receives a first reference signal and a second reference signal from the light reception unit 340 and receives the first interference signal and the second interference signal from the signal generator 350, and mixes the received signals. The mixer 360 may perform a plurality of analog multiplications and one or more difference calculation operations. The mixer 360 mixes the aforementioned signals as follows.

$$x_{Mix(t)} \equiv x_{MZI,q(t)} \otimes x_{Ref,i(t)} \ominus x_{MZI,i(t)} \otimes x_{Ref,q(t)}$$

$$= \sin(\kappa \tau_d t + \phi_N(t)) \times \cos(\kappa \tau_d t) + \cos(\kappa \tau_d t + \phi_N(t)) \times \sin(\kappa \tau_d t)$$

$$= \sin(\kappa \tau_d t + \phi_N(t) - \kappa \tau_d t)$$

$$= \sin(\phi_N(t))$$

Alternatively, the mixer 360 mixes the aforementioned signals as follows.

$$x_{Mix(t)} \equiv x_{MZI,i(t)} \otimes x_{Ref,i(t)} \oplus x_{MZI,q(t)} \otimes x_{Ref,q(t)}$$

$$= \cos(\kappa \tau_d t + \phi_N(t)) \times \cos(\kappa \tau_d t) + \sin(\kappa \tau_d t + \phi_N(t)) \times \sin(\kappa \tau_d t)$$

$$= \cos(\kappa \tau_d t + \phi_N(t) - \kappa \tau_d t)$$

$$= \cos(\phi_N(t))$$

Through the mixing of the mixer 360, only a phase noise signal is output by the mixer 360.

The loop filter unit 380 receives the signal that has been mixed by the mixer 360, and filters out other noise from the signal. The loop filter unit 380 may be implemented as a loop filter, and may filter out other noise.

The error compensation unit 390 converts the phase noise signal that has passed through the loop filter unit 380 into a current signal, and applies, to the light source 310, a current having an error compensated for. Since a light signal that is output by the light source 310 is proportional to the current that is applied to the light source 310 for an operation, the error compensation unit 390 compensates for the phase noise signal with respect to the current that is applied to the light source 310. The error compensation unit 390 may be implemented as a current driver (not illustrated).

The error compensation unit 390 applies, to the light source 310, a current having a frequency noise value compensated for. Accordingly, the light (having the characteristics of a change in the frequency of light for each time) that has been described with reference to FIG. 2 may oscillate from the light source 310.

Furthermore, the FMCW LiDAR apparatus 100 may further include the calculator 365. A phase noise signal that is output by the mixer 360 has a sinusoidal form. However, in order for the error compensation unit 390 to perform error compensation more smoothly, it is preferred that the phase noise signal has a triangular wave form (similar to a form of the frequency of a signal that is output by the light source). Furthermore, in order for the error compensation unit 390 to perform error compensation more exactly, it is preferred that the waveform of the phase noise signal is disposed within an interval in which the waveform of the phase noise signal linearly changes, such as a $-\pi/2$ to $\pi/2$ interval when the phase noise signal has a sine waveform.

To this end, the FMCW LiDAR apparatus 100 includes the calculator 365. A signal that has passed through the loop filter unit 380 and a triangular waveform signal (i.e., a reference signal) are applied to the calculator 365. The calculator 365 receives and mixes the signal and the triangular waveform signal, and outputs a phase noise signal having a sinusoidal form, which has passed through the loop filter unit 380, as a triangular waveform signal. In this case, if the triangular waveform signal having a complete form is applied to the calculator 365 as a reference signal, the output phase noise signal has a triangular waveform, but may have a waveform having a partially distorted form. Accordingly, the triangular waveform signal that is applied to the calculator 365 as the reference signal may be a partially distorted waveform. As such a reference signal is applied to the calculator 365, a phase noise triangular waveform signal having a complete form may be output. The calculator 365 outputs the corresponding signal to the error compensation unit 390.

Figure 4:
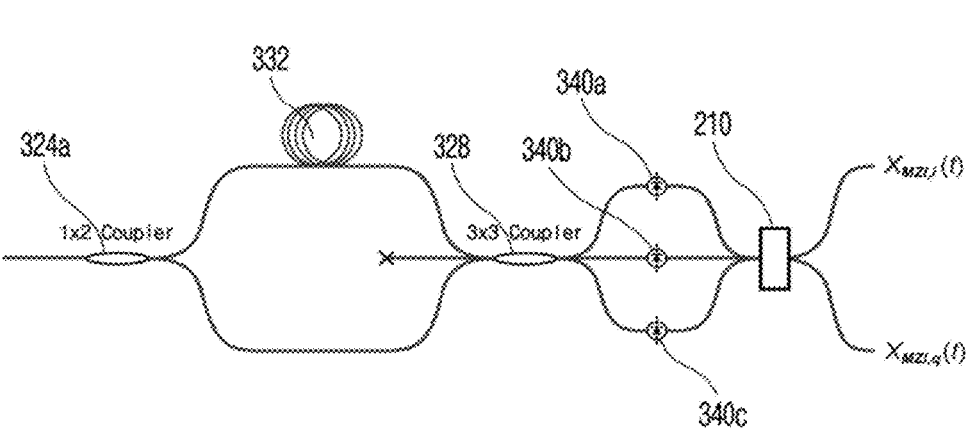
FIG. 4 is a diagram illustrating a construction of an interferometer for measuring a phase error of the light source unit according to another embodiment of the present disclosure.

FIG. 4 is a diagram illustrating a construction of the interferometer for measuring a phase error of the light source unit according to another embodiment of the present disclosure.

The interferometer 330 according to an embodiment of the present disclosure may be implemented as illustrated in FIG. 4.

The distributor 324*a* branches light that is applied to the interferometer 330 into two pieces of light at a ratio of 50:50. Any one of the two pieces of light distributed by the distributor 324*a* is applied to the distributor 328 without separate delay. In contrast, the other of the two pieces of light distributed by the distributor 324*a* is delayed through the optical fiber delay line 332 by a preset time (τd) and then applied to the distributor 328.

The distributor 328 receives a light signal that has been subjected to time delay and a light signal that has not been subjected to time delay after the light has been distributed by the distributor 324*a*, and makes the received light signals interfere with each other as three signals.

First to third light reception units 340*a*, 340*b*, and 340*c* receive the three interference signals, respectively, which have been distributed after interfering with each other in the distributor 328. The interference signals that have interfered with each other in the light reception units 340*a*, 340*b*, and 340*c*, respectively, are as follows.

$$I_1 = I \cdot \cos\left(\kappa \tau_d t + \phi_N(t) + \frac{2\pi}{3}\right)$$

$$I_2 = I \cdot \cos\left(\kappa \tau_d t + \phi_N(t)\right)$$

$$I_3 = I \cdot \cos\left(\kappa \tau_d t + \phi_N(t) - \frac{2\pi}{3}\right)$$

A complex signal generation unit 210 generates a first interference signal and a second interference signal by receiving the interference signals distributed by the distributor 328. The complex signal generation unit 210 generates the first interference signal and the second interference signal by subtracting or amplifying the two interference signals as follows.

$$x_{MZI,i}(t) = I_2 - \frac{1}{2}I_1 - \frac{1}{2}I_3$$

$$x_{MZI,q}(t) = \frac{\sqrt{3}}{2}(I_3 - I_1)$$

The interferometer 330 is implemented as illustrated in FIG. 4, and may make pieces of light applied thereto interfere with each other so that the first interference signal and the second interference signal are generated.

Figure 6:
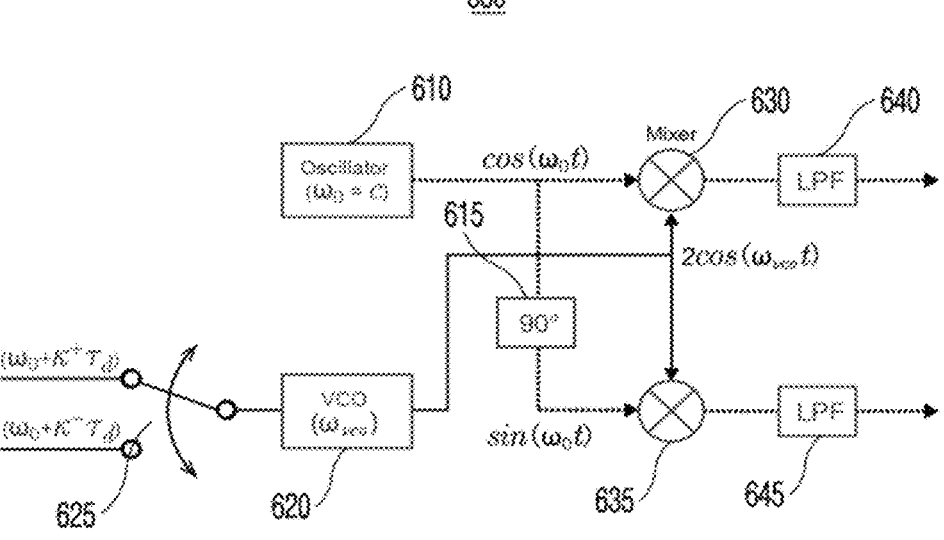
FIG. 6 is a diagram illustrating a construction of the signal generator within the FMCW LiDAR apparatus according to an embodiment of the present disclosure.
Figure 7:
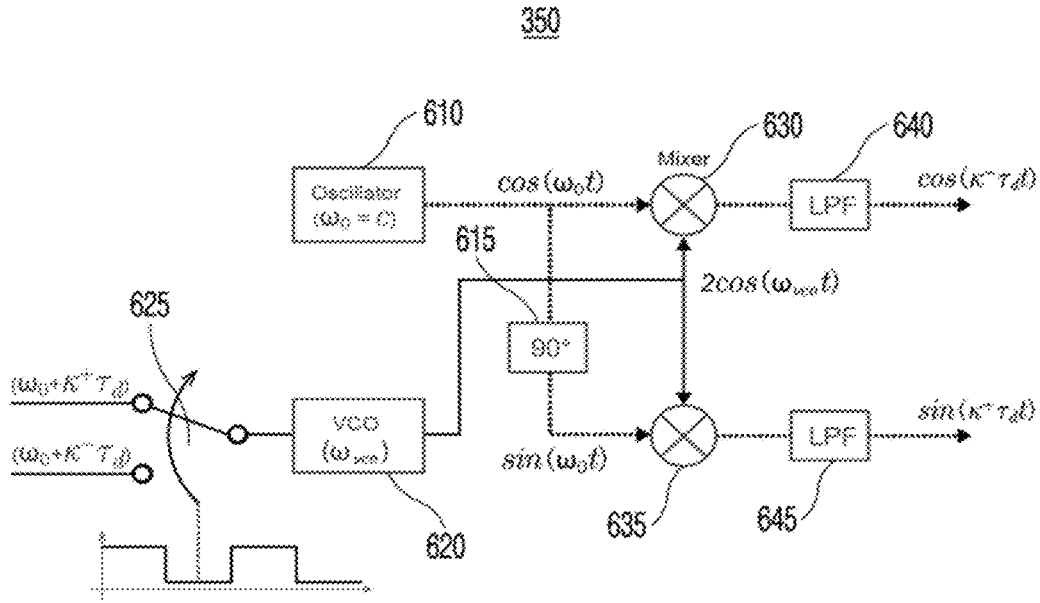
FIGS. 7 and 8A are diagrams illustrating a form in which the signal generator within the FMCW LiDAR apparatus according to an embodiment of the present disclosure operates.
Figure 8A:
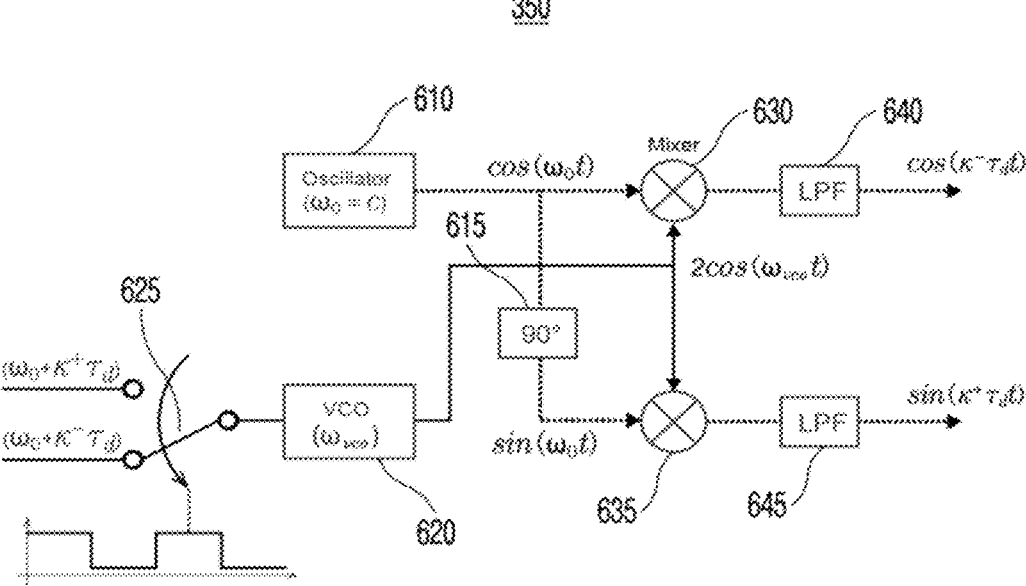

FIG. 6 is a diagram illustrating a construction of the signal generator within the FMCW LiDAR apparatus according to an embodiment of the present disclosure. FIGS. 7 and 8A are diagrams illustrating a form in which the signal generator within the FMCW LiDAR apparatus according to an embodiment of the present disclosure operates.

Referring to FIG. 6, the signal generator 350 according to an embodiment of the present disclosure includes an oscillator 610, a phase delayer 615, a voltage-controlled oscillator (VCO) 620, a switch 625, mixers 630 and 635 and the low pass filters (LPFs) 640 and 645.

The oscillator 610 generates a sine wave having a preset (or arbitrary) frequency (ω0). The oscillator 610 generates a sine wave having a preset frequency, for example, a cosine signal, and applies the cosine signal to the phase delayer 615 and the mixer 630.

The phase delayer 615 delays the phase of the cosine signal, which is applied by the oscillator 610, by 90°. Accordingly, when the cosine signal is generated by the oscillator 610, the cosine signal is output as a sine signal through the phase delayer 615. The phase delayer 615 applies, to the mixer 635, the sine signal by delaying the phase of the sine signal applied thereto.

The VCO 620 generates a sine wave that has a frequency corresponding to the size of a voltage based on the voltage applied thereto. As the switch 625 operates, the size of the voltage that is applied to the VCO 620 becomes different. As the switch 625 operates, the voltage that is applied to the VCO 620 has a size that makes the frequency of the sine wave generated by the VCO 620 have a first frequency or a second frequency. In this case, the first frequency may be a frequency, that is, the sum of a preset frequency (ω0) and a difference (κ+τd) between the frequencies of light that is output in the up-chirp interval and reflected light thereof. The second frequency may be a frequency, that is, the sum of the preset frequency (ω0) and a difference (κ−τd) between the frequencies of light that is output in the down-chirp interval and reflected light thereof. As the switch 625 operates, the VCO 620 generates a sine wave (i.e., a cosine signal) having the first frequency or a sine wave (i.e., a cosine signal) having the second frequency by receiving voltages having different sizes. The VCO 620 applies the sine wave to the mixers 630 and 635.

The switch 625 changes the size of the voltage that is applied to the VCO 620 so that the VCO 620 may generate the sine wave having the first frequency or the sine wave having the second frequency. The switch 625 selectively applies, to the VCO 620, any one of a voltage that enable the VCO 620 to output the sine wave having the first frequency and a voltage that enable the VCO 620 to output the sine wave having the second frequency. Accordingly, although the signal generator 350 is implemented by only analog components, the signal generator 350 may generate the first and second reference signals that are intact, and may divisively generate even reference signals in the up-chirp interval and the down-chirp interval.

The mixer 630 mixes the sine wave generated by the oscillator 610 and the sine wave generated by the VCO 620.

As illustrated in FIG. 7, when the mixer 630 receives the sine wave having the first frequency, which has been generated by the VCO 620, along with the sine wave generated by the oscillator 610, the mixer 630 mixes the signals as follows.

$$= 2\cos(\omega_{vco}t)\cos(\omega_0 t)$$

$$= 2\cos(\omega_0 t + \kappa^+ \tau_d t)\cos(\omega_0 t)$$

$$= \cos(\omega_0 t + \kappa^+ \tau_d t + \omega_0 t) + \cos(\omega_0 t + \kappa^+ \tau_d t - \omega_0 t)$$

$$= \cos(2\omega_0 t + \kappa^+ \tau_d t) + \cos(\kappa^+ \tau_d t)$$

As illustrated in FIG. 8, when the mixer 630 receives the sine wave having the second frequency, which has been generated by the VCO 620, along with the sine wave generated by the oscillator 610, the mixer 630 mixes the signals as follows.

$$= 2\cos(\omega_{vco}t)\cos(\omega_0 t)$$

$$= 2\cos(\omega_0 t + \kappa^-\tau_d t)\cos(\omega_0 t)$$

$$= \cos(\omega_0 t + \kappa^-\tau_d t + \omega_0 t) + \cos(\omega_0 t + \kappa^-\tau_d t - \omega_0 t)$$

$$= \cos(2\omega_0 t + \kappa^-\tau_d t) + \cos(\kappa^-\tau_d t)$$

The mixer 635 mixes the sine wave that has passed through the phase delayer 615 and the sine wave that has been generated by the VCO 620.

As illustrated in FIG. 7, when the mixer 635 receives the sine wave having the first frequency, which has been generated by the VCO 620, along with the sine wave that has passed through the phase delayer 615, the mixer 630 mixes the signals as follows.

$$= 2\cos(\omega_{vco}t)\sin(\omega_0 t)$$

$$= 2\cos(\omega_0 t + \kappa^+\tau_d t)\sin(\omega_0 t)$$

$$= \cos(\omega_0 t + \kappa^+\tau_d t + \omega_0 t) - \sin(\omega_0 t + \kappa^+\tau_d t - \omega_0 t)$$

$$= \cos(2\omega_0 t + \kappa^+\tau_d t) - \sin(\kappa^+\tau_d t)$$

As illustrated in FIG. 8, when the mixer 630 receives the sine wave having the second frequency, which has been generated by the VCO 620, along with the sine wave generated by the oscillator 610, the mixer 630 mixes the signals as follows.

$$= 2\cos(\omega_{vco}t)\sin(\omega_0 t)$$

$$= 2\cos(\omega_0 t + \kappa^-\tau_d t)\sin(\omega_0 t)$$

$$= \cos(\omega_0 t + \kappa^-\tau_d t + \omega_0 t) - \sin(\omega_0 t + \kappa^-\tau_d t - \omega_0 t)$$

$$= \cos(2\omega_0 t + \kappa^-\tau_d t) - \sin(\kappa^-\tau_d t)$$

The mixers 630 and 635 mix the signals, respectively, as described above, and apply the mixed signals to the LPFs 640 and 645, respectively.

Each of the LPFs 640 and 645 filters out components other than the first and second reference signals from the signal applied thereto.

As illustrated in FIG. 7, when the signals are applied to the LPFs 640 and 645, respectively, each LPF performs the filtering as follows.

$$LPF(640) = \cos(2\omega_0 t + \kappa^+\tau_d t) + \cos(\kappa^+\tau_d t)$$

$$= \cos(\kappa^+\tau_d t)$$

$$= \cos(-\kappa^+\tau_d t)$$

$$= \cos(\kappa^-\tau_d t)(\because \kappa^+ = -\kappa^-)$$

$$LPF(645) = \cos(2\omega_0 t + \kappa^+\tau_d t) - \sin(\kappa^+\tau_d t)$$

$$= -\sin(\kappa^+\tau_d t)$$

-continued $$= \sin(-\kappa^+\tau_d t)$$

$$= \sin(\kappa^-\tau_d t)$$

Accordingly, in the up-chirp interval, the signal generator 350 may output the aforementioned signal.

In contrast, as illustrated in FIG. 8, when the signals are applied to the LPFs 640 and 645, respectively, each LPF performs the filtering as follows.

$$LPF(640) = \cos(2\omega_0 t + \kappa^-\tau_d t) + \cos(\kappa^-\tau_d t)$$

$$= \cos(\kappa^-\tau_d t)$$

$$= \cos(-\kappa^-\tau_d t)$$

$$= \cos(\kappa^+\tau_d t)$$

$$LPF(645) = \cos(2\omega_0 t + \kappa^-\tau_d t) - \sin(\kappa^-\tau_d t)$$

$$= -\sin(\kappa^-\tau_d t)$$

$$= \sin(-\kappa^-\tau_d t)$$

$$= \sin(\kappa^+\tau_d t)$$

Accordingly, in the down-chirp interval, the signal generator 350 may output the aforementioned signal.

That is, although the signal generator 350 includes only analog components, the signal generator 350 may generate the first and second reference signals that are intact. In particular, in generating the first and second reference signals, the signal generator 350 may wholly generate the first and second reference signals that are suitable for each of the up-chirp interval and the down-chirp interval, by dividing the up-chirp interval and the down-chirp interval.

Figure 8B:
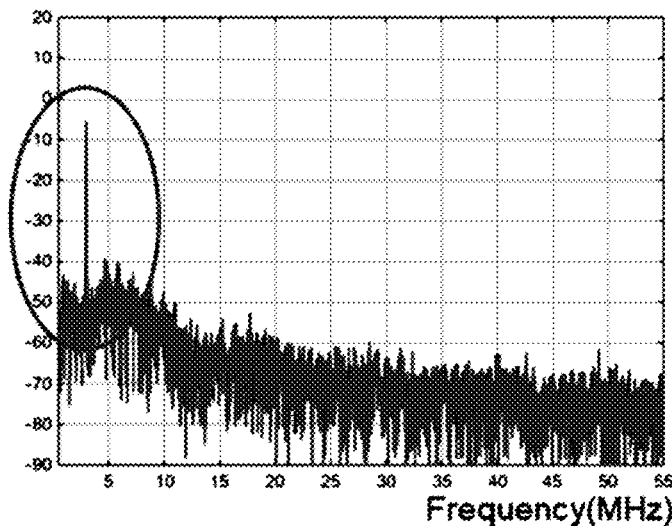
FIGS. 8B and 8C illustrate frequency spectra of the FMCW LiDAR apparatus according to a distance to a target according to an embodiment of the present disclosure.
Figure 8C:
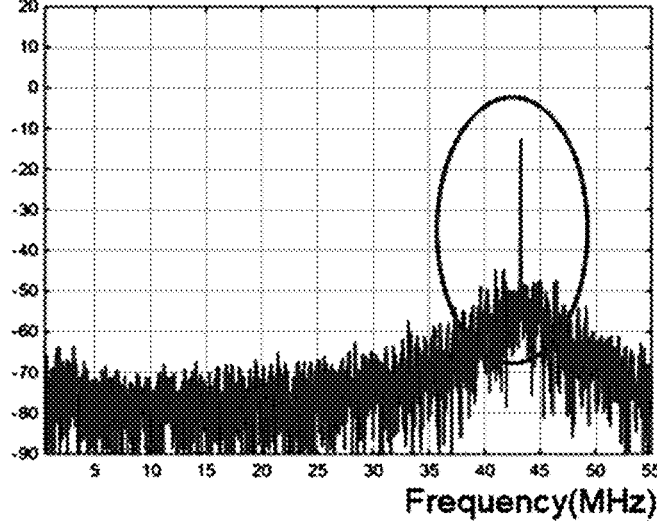

FIGS. 8B and 8C illustrate frequency spectra of the FMCW LiDAR apparatus according to a distance to a target according to an embodiment of the present disclosure.

The FMCW LiDAR apparatus 100 can obtain a relatively high signal to noise ratio although a target is disposed at a long distance as illustrated in FIG. 8C in addition to a case in which a target is disposed at a short distance as illustrated in FIG. 8B. Accordingly, the FMCW LiDAR apparatus 100 can obtain a sharp bit frequency when performing frequency signal processing by FFT.

Figure 9:
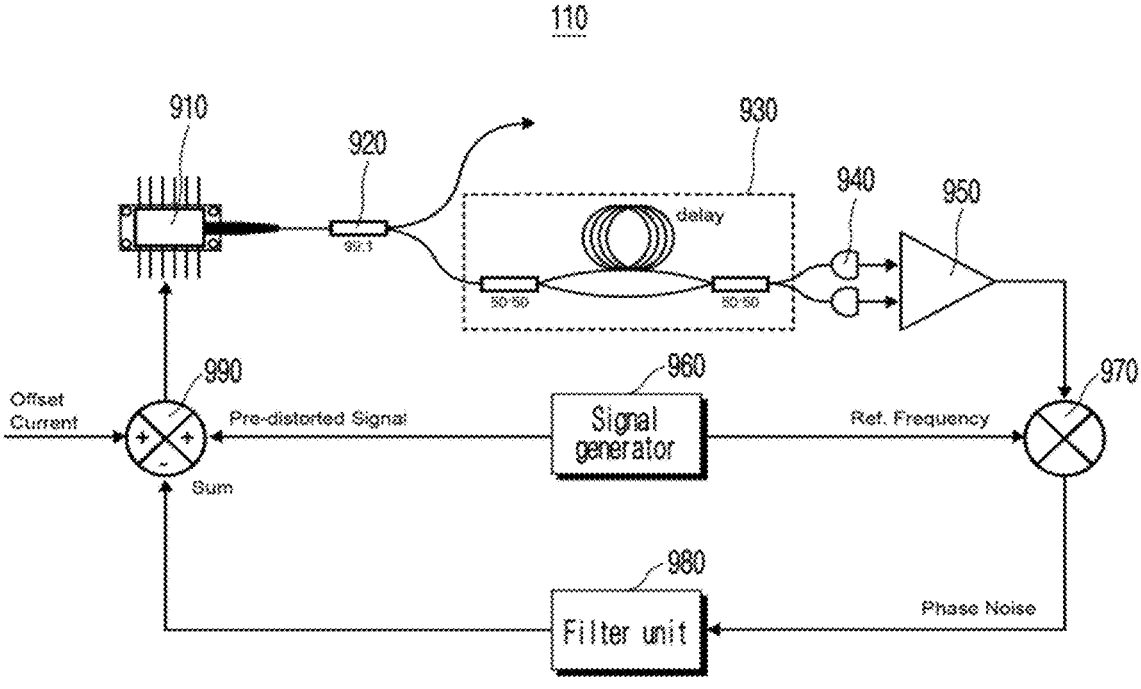
FIG. 9 is a diagram illustrating a construction of a light source unit according to another embodiment of the present disclosure.

FIG. 9 is a diagram illustrating a construction of the light source unit according to another embodiment of the present disclosure.

Referring to FIG. 9, the light source unit 110 according to another embodiment of the present disclosure includes a light source 910 and a stabilization unit (not illustrated). The stabilization unit (not illustrated) includes a distributor 920, an interferometer 930, a light reception unit 940, an amplifier 950, a signal generator 960, a mixer 970, a filter unit 980, and a calculation unit 990.

The light source 910 makes light for detecting a target oscillate by receiving a current. The light source 910 may be implemented as a narrow line width laser diode.

The distributor 920 distributes the light that is output by the light source 910 into light for an operation (i.e., detecting a target) of the LiDAR apparatus 100 and light for frequency modulation linearization. The distributor 920 may distribute the light for an operation of the LiDAR apparatus at a preset ratio, for example, 90% or more compared to the light for frequency modulation linearization. The light distributed by the distributor 920 may be branched into a separate component (not illustrated) for detection within the LiDAR apparatus and radiated to the outside.

The light that has been branched for frequency modulation linearization by the distributor 920 is applied to the interferometer 930. The interferometer 930 makes some of the applied light subjected to time delay, and makes light that has not been delayed and light that has been subjected to time delay interfere with each other. Furthermore, the interferometer may make some of the applied light subjected to both time delay and/or phase delay, and may make light that has not been delayed and light that has been subjected to time delay and/phase delay interfere with each other.

The interferometer 930 includes a first distributor, a delay line, and a second distributor, forms light that has not been delayed and light that has been subjected to time delay, and makes the light that has not been delayed and the light that has been subjected to time delay interfere with each other. Accordingly, the following interference light is formed.

$$x_{MZI}(t) = \sin(\kappa \tau_d t + \phi_n(t))$$

In this case, xMZI (t) (hereinafter denoted as "interference light") means interference light of the light that has not been subjected to time delay and the light that has been subjected to time delay. φN(t) means phase noise that has occurred.

Furthermore, the interferometer 930 may increase the number of pieces of interference light that is generated by including more distributors. Furthermore, the interferometer 930 may further include a phase delayer, may form light that has not been subjected to both time delay and phase delay, light that has been subjected to time delay, but that has been not subjected to phase delay, and light that has been subjected to both time delay and phase delay, and may make the light that has not been subjected to both time delay and phase delay, the light that has been subjected to time delay, but that has been not subjected to phase delay, and the light that has been subjected to both time delay and phase delay interfere with one another. Accordingly, the interferometer 930 may form a plurality of pieces of interference light.

The light reception unit 940 senses the interference light as an interference signal (or a current signal).

The amplifier 950 amplifies the interference signal of the light reception unit 940 and converts the interference signal into a voltage signal. The amplifier 950 may be implemented as a trans-impedance amplifier (TIA), and may perform the aforementioned operation.

The signal generator 960 generates ideal interference light (XRef(t)) when phase noise has not occurred as a voltage signal (hereinafter denoted as a "reference signal"), and applies the reference signal to the mixer 970. The reference signal that is generated by the signal generator 960 is represented as follows.

$$x_{Ref}(t) = \cos(\kappa \tau_d t)$$

The reference signal that is generated by the signal generator 960 has a form in which a sine wave and a harmonics signal thereof have been combined. However, the reference signal that is generated by the signal generator 960 has a form that includes only a pure sine wave and a harmonics signal thereof, and has a form that does not include other noise.

Furthermore, the signal generator 960 generates a partially distorted triangular waveform and applies the partially distorted triangular waveform to the calculation unit 990 so that the calculation unit 990 can apply a current having phase noise compensated for to the light source 910. In this case, the signal generator 960 has a construction to be described with reference to FIGS. 10 to 14, and thus may perform all of the aforementioned operations although the signal generator is implemented by only relatively and significantly small and cheap analog components.

The mixer 970 receives an interference signal from the amplifier 950, receives the reference signal from the signal generator 960, and mixes the interference signal and the reference signal. The mixer 970 may perform a plurality of analog multiplication operations, or may perform one or more difference calculation operations along with a multiplication operation. The mixer 970 mixes the interference signal and the reference signal as follows.

$$x_{Mix(t)} \equiv x_{MZI}(t) \otimes x_{Ref}(t)$$

$$= \sin(\kappa \tau_d t + \phi_N(t)) \times \cos(\kappa \tau_d t)$$

$$= \frac{1}{2} \sin(\phi_N(t)) + \frac{1}{2} \sin(2\kappa \tau_d t + \phi_n(t))$$

According to the mixing of the mixer 970, a signal including only a phase noise component and a harmonics signal are output.

The filter unit 980 receives the signal that has been mixed by the mixer 970, and filters out the remaining components except the signal including only the phase noise component. The filter unit 980 may be implemented as any filter capable of filtering out the remaining components except the signal including only the phase noise component, may be implemented as a band pass filter (BPF) or a band reject filter (BRF), for example, and may be implemented as a notch filter in order to derive a more excellent effect.

Furthermore, the filter unit 980 may further include a loop filter in addition to the aforementioned filter. The loop filter may remove other noise within a signal, and may improve the linearity of a signal to be output by the light source 910. The calculation unit 990 receives the phase noise signal that has passed through the filter unit 980, the partially distorted triangular waveform from the signal generator 960, and an offset signal from the outside, and applies a current having an error compensated for (i.e., a current that enables the light source to output an ideal output signal) to the light source 910. The light signal that is output by the light source 910 is proportional to the current that is applied to the light source 910 for an operation. Accordingly, the calculation unit 990 compensates for the phase noise signal with respect to the current that is applied to the light source 910.

In this case, the phase noise signal that is output by the mixer 970 has a sinusoidal form. However, in order for error compensation to be more smoothly performed in the calculation unit 990, it is preferred that the phase noise signal has a triangular wave form (similar to a form of the frequency of the signal that is output by the light source).

To this end, the partially distorted triangular waveform from the signal generator 960, in addition to the phase noise signal that has passed through the filter unit 980, is applied to the calculation unit 990. The calculation unit 990 receives and mixes both the signals, and outputs the phase noise signal (having a sinusoidal form) that has passed through the filter unit 980 as a triangular waveform signal. At this time, when the triangular waveform signal having a complete form is applied from the signal generator 960 to the calculation unit 990, the phase noise signal that is output has a triangular waveform, but may have a waveform having a form partially distorted. Accordingly, as the partially distorted triangular waveform is applied from the signal generator 960 to the calculation unit 990, a phase noise triangular waveform signal having a complete form may be formed, and the phase noise signal can be accurately compensated for.

Figure 10:
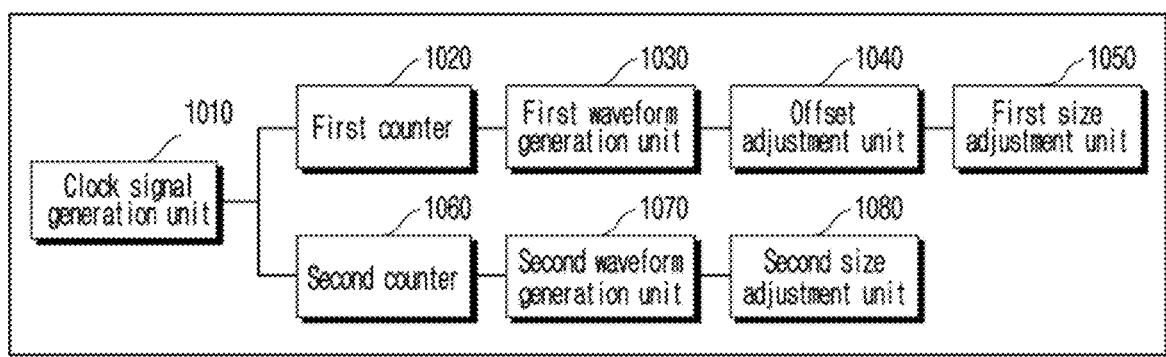
FIG. 10 is a diagram illustrating a construction of a signal generator according to another embodiment of the present disclosure.

FIG. 10 is a diagram illustrating a construction of the signal generator according to another embodiment of the present disclosure. FIGS. 13 and 14 are diagrams exemplifying a process of the signal generator generating waveforms According to another embodiment of the present disclosure.

Referring to FIG. 10, the signal generator 960 according to an embodiment of the present disclosure includes a clock signal generation unit 1010, a first counter 1020, a first waveform generation unit 1030, an offset adjustment unit 1040 a first size adjustment unit 1050, a second counter 1060, a second waveform generation unit 1070, and a second size adjustment unit 1080. In this case, the first counter 1020, the first waveform generation unit 1030, the offset adjustment unit 1040, and the first size adjustment unit 1050 generate a reference signal and apply the reference signal to the mixer 970. The second counter 1060, the second waveform generation unit 1070, and the second size adjustment unit 1080 generate a partially distorted triangular waveform signal and apply the partially distorted triangular waveform signal to the calculation unit 990.

Figure 13A:
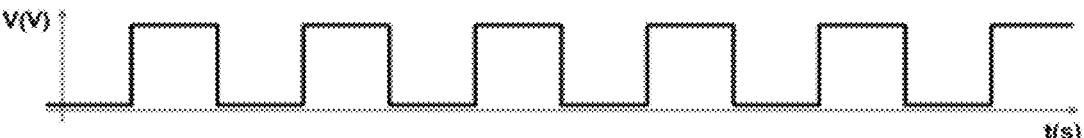
FIGS. 13A, 13B, 13C, 13D, 14A, 14B and 14C are diagrams exemplifying a process of the signal generator generating waveforms according to another embodiment of the present disclosure.
Figure 14A:
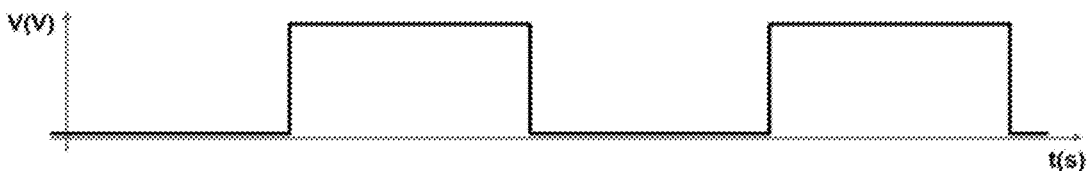

The clock signal generation unit 1010 generates a clock signal having a square waveform. The clock signal generation unit 1010 generates the clock signal having a square waveform having 0 or 1, as illustrated in FIG. 13A or 14A. The clock signal generation unit 1010 may be a component that is embedded in a CPU, and may be a component that separately generates only a clock signal. The clock signal generation unit 1010 may be implemented very cheaply although the clock signal generation unit is implemented by using any component.

The first counter 1020 counts the clock signal by receiving the clock signal that is generated by the clock signal generation unit 1010. The first counter 1020 counts the clock signal so that the reference signal to be generated has a proper frequency. For example, assuming that the reference signal has a frequency of 1.5 MHz and the clock signal has a frequency of 48 MHz, the first counter 1020 may count the clock signal by branching the clock signal into 32 so that the reference signal has the corresponding frequency. Accordingly, the first counter 1020 counts the clock signal so that a clock signal having a frequency, such as that illustrated in FIG. 13A, is generated.

The first waveform generation unit 1030 generates the reference signal having a preset waveform by receiving the clock signal that is counted (or generated) by the first counter 1020. In this case, the preset waveform has a form that includes a sine wave and harmonics thereof. The first waveform generation unit 1030 may be implemented as an RC circuit which may be implemented very small and cheaply as illustrated in FIG. 11, for example, a low pass filter (LPF).

Figure 11:
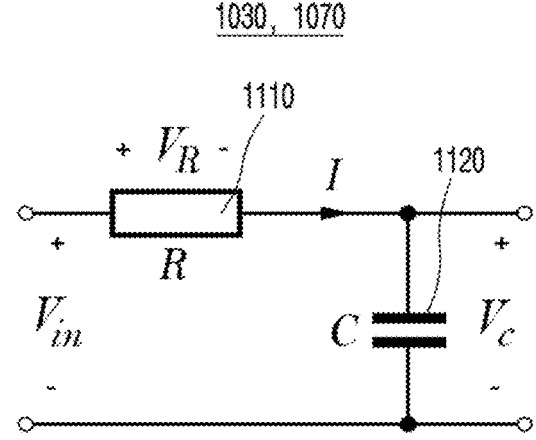
FIG. 11 is a diagram illustrating an implementation example of a waveform generation unit according to another embodiment of the present disclosure.
Figure 12:
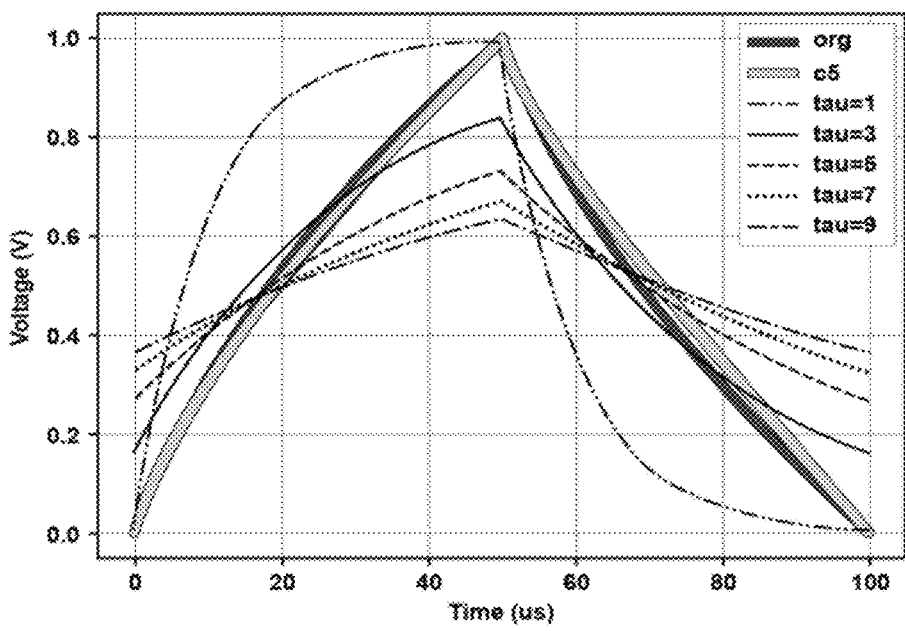
FIG. 12 is a graph illustrating an example of waveforms which may be generated by the waveform generation unit according to another embodiment of the present disclosure.

FIG. 11 is a diagram illustrating an implementation example of a waveform generation unit according to another embodiment of the present disclosure. FIG. 12 is a graph illustrating an example of waveforms which may be generated by the waveform generation unit according to another embodiment of the present disclosure.

Referring to FIG. 11, the waveform generation unit 1030, 1070 according to an embodiment of the present disclosure has been implemented in the form of an RC circuit in which a resistor 1110 and a capacitor 1120 have been connected in series. A voltage (Vin) is applied to the entire waveform generation unit 1030, 1070. A voltage (Vc) that is applied to both ends of the capacitor 1120 is output.

In this case, a form of the voltage (Vc) that is output varies depending on the size of a time constant ($\tau=R*C$) that is formed by the resistor 1110 and the capacitor 1120 as illustrated in FIG. 11.

As illustrated in FIG. 12, assuming that an ideal signal to be output is an org signal or a c5 signal, when the time constant has a range of 3 to 9, the waveform generation unit 1030, 1070 may output a signal that has a size different from the size of the ideal signal, but has a waveform very similar to the waveform of the ideal signal. Furthermore, when the time constant is 1, the waveform generation unit 1030, 1070 may output a signal having a sinusoidal form. The corresponding sine wave signal is not a pure sine wave or cosine wave not having a harmonics component, but has a form in which only a harmonics component having the corresponding waveform has been combined with the pure sine wave or cosine wave. That is, the signal having a sinusoidal form, which is generated by the waveform generation unit 1030, 1070, has a form that includes only a sine wave component and a harmonics component thereof.

Figure 13B:
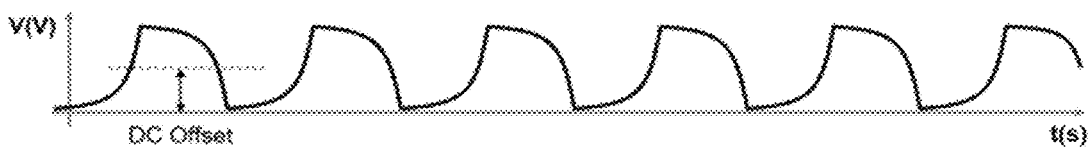

Referring back to FIG. 10, if the first waveform generation unit 1030 is implemented as described above, the first waveform generation unit 1030 generates a reference signal having a preset waveform (i.e., a waveform including a sine wave and a harmonics component thereof), such as that illustrated in FIG. 13B.

Figure 13C:
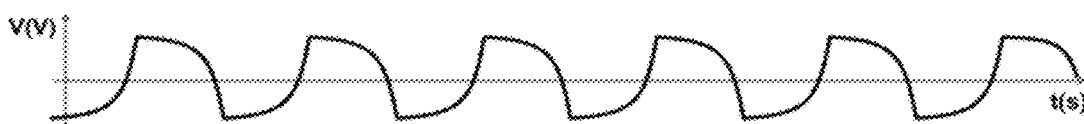

The offset adjustment unit 1040 adjusts an offset value of the reference signal that has been generated by the first waveform generation unit 1030. The offset adjustment unit 1040 may be implemented as a high pass filter (HPF), and adjusts the offset value of the reference signal that has been generated by the first waveform generation unit 1030. The reference signal that has been generated by the first waveform generation unit 1030 has been generated based on the clock signal generated by the first counter 1020. Accordingly, the reference signal has a value within a range of 0 to 1 like the clock signal. However, the reference signal needs to have a form in which amplitude thereof varies on the basis of 0 because the reference signal has to have a form that includes a sine wave or a sine wave and harmonics thereof. Accordingly, the offset adjustment unit 1040 adjusts the offset value of the reference signal that has been generated by the first waveform generation unit 1030 so that the reference signal has a form in which a value of the reference signal varies on the basis of 0 as illustrated in FIG. 13C.

Figure 13D:
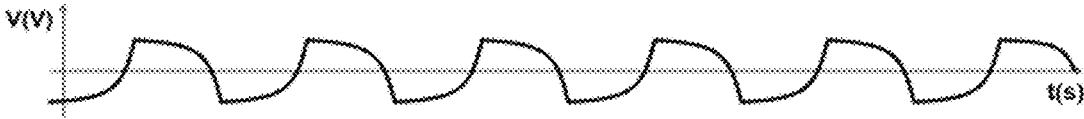

The first size adjustment unit 1050 adjusts the amplitude of the reference signal that has passed through the offset adjustment unit 1040. The first size adjustment unit 1050 is implemented as a component that adjusts the amplitude of a signal, such as an attenuator, and adjusts the amplitude of the reference signal. As described above, the waveform generation unit may generate a waveform that is the same as or similar to the waveform of a signal to be generated, but has a difficulty in making even the amplitude of a signal identical with or similar to the amplitude of a signal that needs to be generated. Accordingly, as illustrated in FIG. 13D, the first size adjustment unit 1050 generates the reference signal that has passed through the offset adjustment unit 1040 as a reference signal having a form to be output by finally adjusting the amplitude of the reference signal that has passed through the offset adjustment unit 1040. The first size adjustment unit 1050 applies the generated reference signal to the mixer 970.

The second counter 1060, the second waveform generation unit 1070, and the second size adjustment unit 1080 perform the same operation as the first counter 1020, the first waveform generation unit 1030, and the first size adjustment unit 1050. However, as described above, as the second counter 1060, the second waveform generation unit 1070, and the second size adjustment unit 1080 generate the partially distorted triangular waveform signal, a branch that is counted by the second counter 1060 (i.e., the frequency of the clock signal that is finally generated) and the waveform that is generated by the second waveform generation unit 1070 have different forms.

The second counter 1060 counts a clock signal by receiving the clock signal that is generated by the clock signal generation unit 1010. The second counter 1060 counts the clock signal so that a triangular waveform signal to be generated has a proper frequency. For example, assuming that the triangular waveform signal has a frequency of 10 kHz and the clock signal has a frequency of 48 MHZ, the second counter 1060 may count the clock signal by branching the clock signal into 10800 so that the triangular waveform m signal has the corresponding frequency. Accordingly, the second counter 1060 counts the clock signal so that a clock signal having a frequency, such as that illustrated in FIG. 14A, is generated.

Figure 14B:
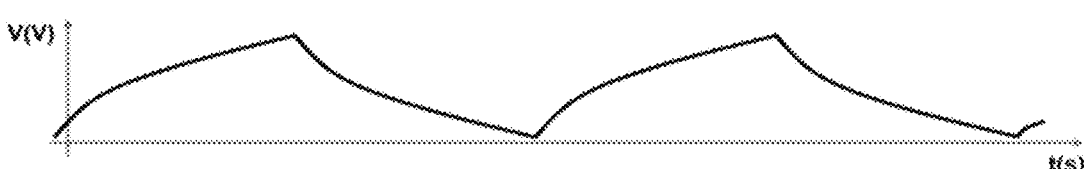

The second waveform generation unit 1070 generates a partially distorted triangular waveform signal by receiving the clock signal that has been counted by the second counter 1060 as illustrated in FIG. 14B. The second waveform generation unit 1070 is implemented as an RC circuit, and may generate the partially distorted triangular waveform signal based on a value of the time constant.

Figure 14C:
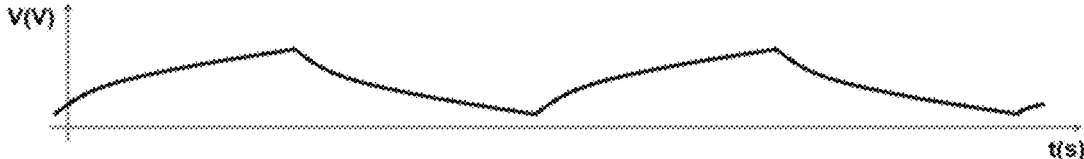

The second size adjustment unit 1080 adjusts the size of the waveform that has been generated by the second waveform generation unit 1070. The second size adjustment unit 1080 generates the triangular waveform signal that has passed through the second waveform generation unit 1070 as a triangular waveform signal having a size to be output as illustrated in FIG. 14C. The second size adjustment unit 1080 applies the generated (partially distorted) triangular waveform signal to the calculation unit 990.

The signal generator 960 is implemented as described above, and thus the size and manufacturing cost of the signal generator can be significantly reduced compared to a conventional direct digital synthesizer (DDS). Furthermore, the signal generator 960 has been implemented as an analog digital mix circuit, but can be effectively constructed and operate at a low cost because the signal generator does not include an expensive high-speed and high-resolution digital to analog converter (DAC) or an expensive analog mixer.

Figure 15:
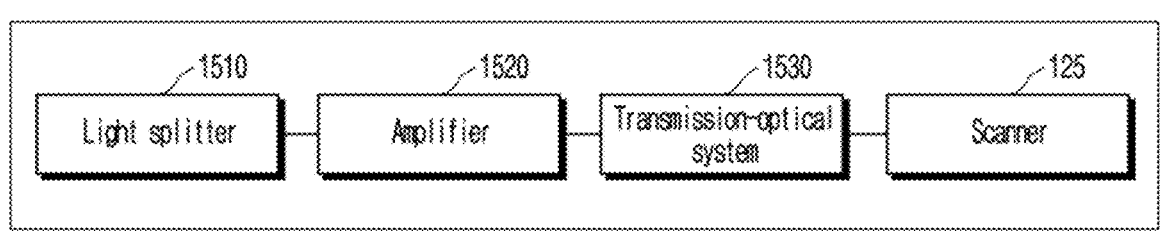
FIG. 15 is a diagram illustrating a construction of a light transmission unit according to an embodiment of the present disclosure.
Figure 16:
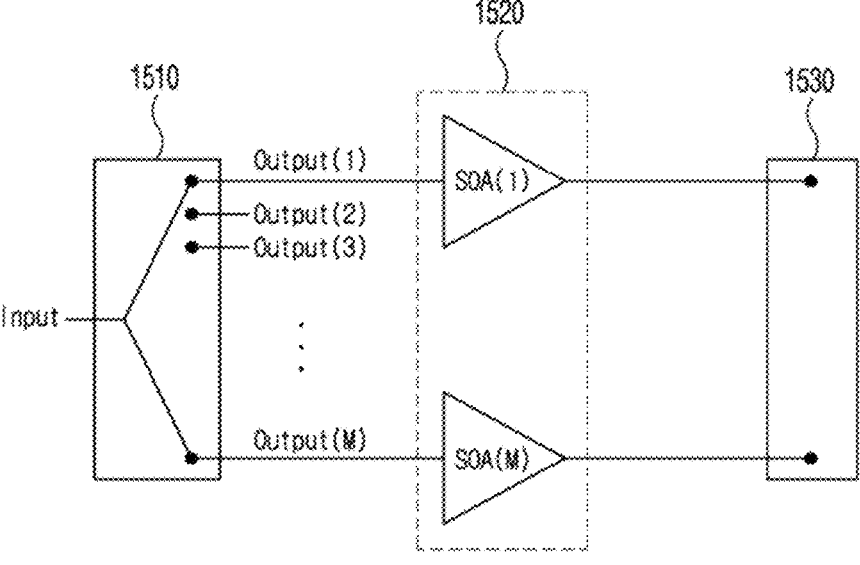
FIG. 16 is a diagram illustrating an implementation example of the light transmission unit according to an embodiment of the present disclosure.

FIG. 15 is a diagram illustrating a construction of a light transmission unit according to an embodiment of the present disclosure. FIG. 16 is a diagram illustrating an implementation example of the light transmission unit according to an embodiment of the present disclosure.

Referring to FIGS. 15 and 16, the light transmission unit 120 according to an embodiment of the present disclosure includes a light splitter 1510, an amplifier 1520, and a transmission-optical system 1530. Furthermore, the light transmission unit 120 and/or the light reception unit 130 to be described later may further include a scanner 125.

Figure 19:
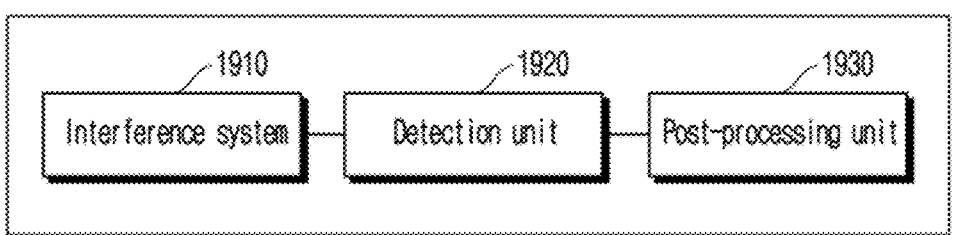
FIG. 19 is a diagram illustrating a construction of a signal processing unit according to an embodiment of the present disclosure.

The light splitter 1510 separates light that is output by the light source unit 110 into M pieces of light. As illustrated in FIG. 19, the light splitter 1510 may be implemented as an M:1 light splitter. Accordingly, the light splitter 1510 receives light that is output by the light source unit 110 and separates the light into the M pieces of light. The light splitter 1510 inputs the pieces of separated light to the amplifier 1520.

The amplifier 1520 amplifies the light that is incident thereon. The amplifier 1520 may be implemented as a semiconductor optical amplifier (SOA). In order to remove a resonator structure from the amplifier 1520, anti-reflection processing may be applied to both sides of the SOA. Accordingly, the amplifier 1520 amplifies light by induction emission by receiving the light from the outside.

The amplifier 1520 may be implemented in the form of an SOA array. The amplifier 1520 may constitute multiple channels with a low cost by being implemented in the form of the SOA array and amplifying multi-channel light, and may also maintain a coherent characteristic of light. The amplifier 1520 may be used as a high-speed scanner because the SOA has a low price and enables high-speed switching in view of its structure.

The amplifier 1520 may simultaneously drive all the channels, and may and switch drive all the channels sequentially/non-sequentially.

The transmission-optical system 1530 receives amplified light from the amplifier 1520 and transmits the amplified light to a detection area. The transmission-optical system 1530 may be implemented as illustrated in FIG. 17.

Figure 17:
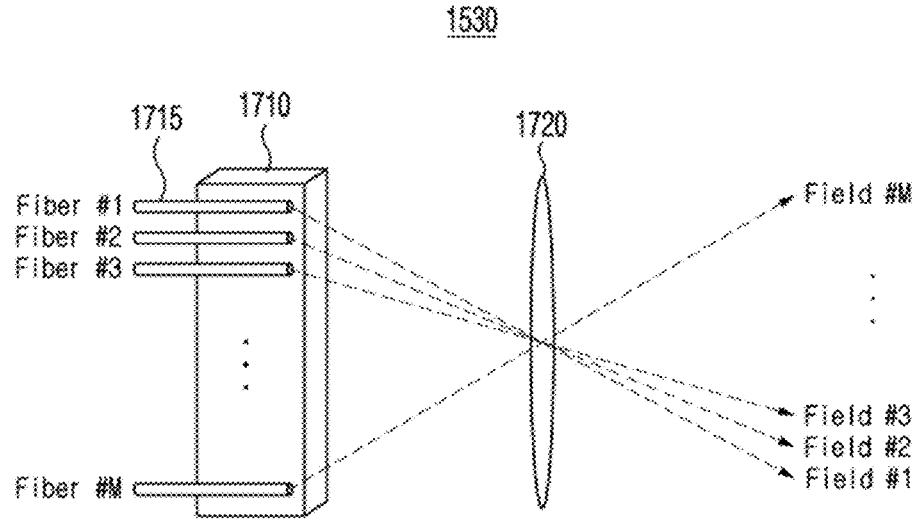
FIG. 17 is a diagram illustrating an implementation example of a transmission-optical system according to an embodiment of the present disclosure.

FIG. 17 is a diagram illustrating an implementation example of a transmission-optical system according to an embodiment of the present disclosure.

Laser light that has been amplified by the amplifier 1520 implemented in the form of the SOA array is input to an optical fiber array 1710 included in the transmission-optical system 1530. As illustrated in FIG. 17, M (the same as the number of pieces of light separated by the light splitter) optical fibers 1715 are disposed in parallel in the optical fiber array 1710 in a first direction (i.e., a direction perpendicular to a direction in which light proceeds). The M pieces of light that are output by the optical fibers 1715 within the optical fiber array 1710, respectively, may be output without any change, or may be transmitted to a detection area through other optical component 1720 that adjusts the light path of light.

If the light transmission unit 120 includes only the light splitter 1510, the amplifier 1520, and the transmission-optical system 1530, a LiDAR that apparatus scans light in the aforementioned first direction may be constructed. However, if the light transmission unit 120 further includes the scanner 125, a LiDAR apparatus that scans light in two dimensions may be constructed. The scanner 125 may scan light that is output in two dimensions by scanning the light in a second direction perpendicular to the first direction. In general, scanning in the second direction for two-dimensional scanning does not require high-speed driving because one-dimensional scanning can be driven at a very high speed in the first direction by the remaining components 1510 to 1530 of the light transmission unit 120. Accordingly, the scanner 125 that performs scanning in the second direction does not have special restrictions or requirements, and may be implemented as an arbitrary scanner.

Figure 18:
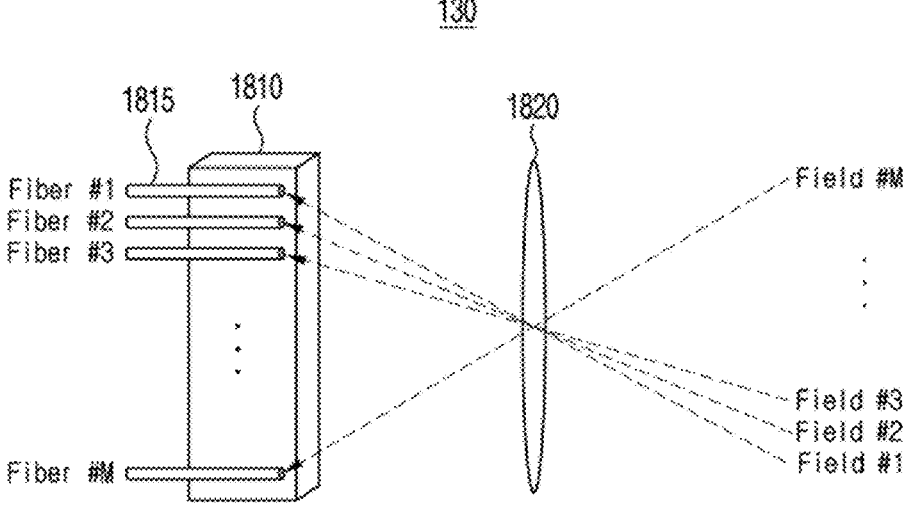
FIG. 18 is a diagram illustrating a construction of a light reception unit according to an embodiment of the present disclosure.

FIG. 18 is a diagram illustrating a construction of a light reception unit according to an embodiment of the present disclosure.

Referring to FIG. 18, the light reception unit 130 includes an optical fiber array 1810 including M optical fibers. Reflected light that is reflected by a detection area or a target is input to M optical fibers 1815 within the optical fiber array 1810. The optical fiber array 1810 is aligned on the same line of sight (LOS) as the optical fiber array 1710, and has the same structure as the optical fiber array 1710 except a transmission direction.

The light reception unit 130 may further include other optical component 1820 so that reflected light that is reflected by a detection area or a target is input to each optical fiber 1815 within the optical fiber array 1810 more smoothly.

FIG. 19 is a diagram illustrating a construction of a signal processing unit according to an embodiment of the present disclosure.

Referring to FIG. 19, the signal processing unit 140 according to an embodiment of the present disclosure includes an interferometer 1910, a detection unit 1920, and a post-processing unit 1930.

The interferometer 1910 may include a complex signal interferometer having a 90-degree optical hybrid structure, and may have a form in which multiple complex signal interferometer have been disposed in parallel. One implementation example of the interferometer 1910 has been illustrated in FIG. 20A or 20B.

Figure 20A:
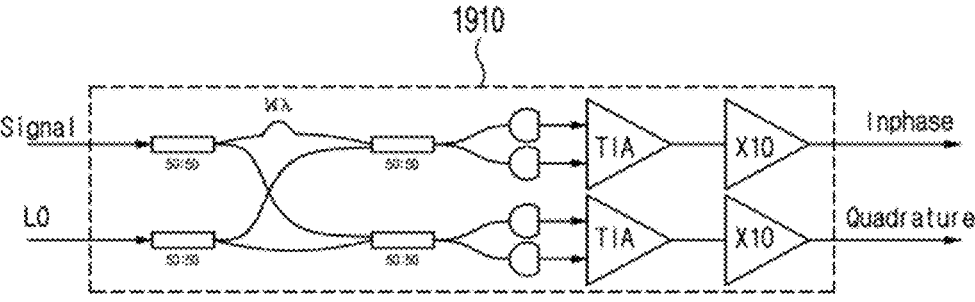
FIGS. 20A and 20B are diagrams illustrating implementation examples of an interferometer within the signal processing unit according to an embodiment of the present disclosure.
Figure 20B:
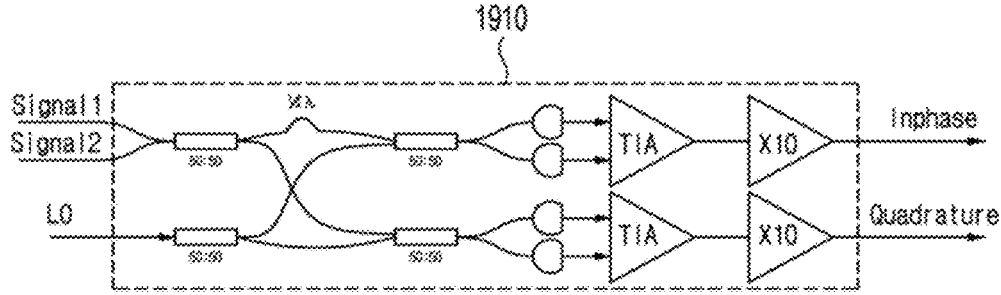

FIGS. 20A and 20B are diagrams illustrating implementation examples of an interferometer within the signal processing unit according to an embodiment of the present disclosure.

Referring to FIG. 20A, some of light that is generated by a coherent laser oscillator is branched and input to a local oscillator (LO) of the interferometer 1910. A signal (Signal) is very weak reflected light that is reflected by a target. It is very difficult to detect or impossible to detect the signal because the size of the signal is very small.

Accordingly, the interferometer 1910 makes the signal, that is, the weak reflected light, interfere with the LO, and amplifies the reflected light by an amplification effect that is generated by the interference so that the detection unit 1920 can easily detect the reflected light.

The interferometer 1910 generates an in-phase signal and a quadrature signal (i.e., a signal having a phase difference of 90 degrees from the in-phase signal) in order to generate a complex signal for the processing of a fast Fourier transform (FFT) signal and the demodulation of an amplitude modulation signal.

Referring to FIG. 20B, the interferometer 1910 may have two signal channels in order to efficiently construct a multichannel structure. When two or more input signals are input to an interferometer simultaneously, in general, it is impossible to distinguish between the input signals because output signals are mixed. However, the interferometer 1910 may obtain input signals for two channels by using one interferometer having a 90-degree optical hybrid structure because a transmission channel for each input signal can switch in an output channel. Accordingly, costs for fabricating a reception channel can be generally reduced.

Referring back to FIG. 19, the detection unit 1920 detects reflected light (i.e., light) that has been amplified through the interferometer 1910.

The post-processing unit 1930 converts a signal that has been detected by the detection unit 1920 into a digital signal, and then obtains coordinate information of the target through post-processing.

Figure 21:
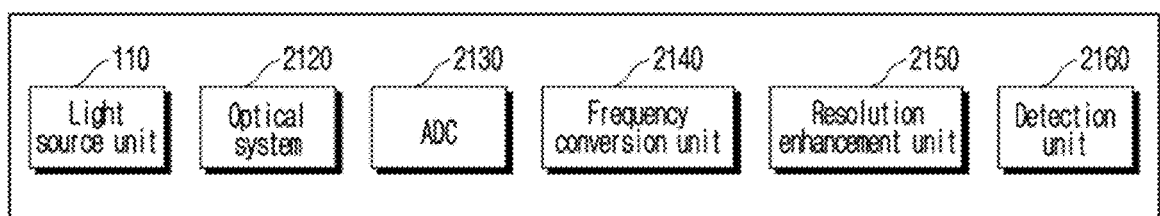
FIG. 21 is a diagram illustrating a construction of an FMCW LiDAR apparatus according to another embodiment of the present disclosure.

FIG. 21 is a diagram illustrating a construction of an FMCW LiDAR apparatus according to another embodiment of the present disclosure.

Referring to FIG. 21, an FMCW LiDAR apparatus 2100 according to an embodiment of the present disclosure includes a light source unit 110, an optical system 2120, an analog-to-digital converter (ADC) 2130, a frequency conversion unit 2140, a resolution enhancement unit 2150, and a detection unit 2160.

The light source unit 110 is implemented by the aforementioned components, and performs an operation.

The optical system 2120 adjusts the path or state of light that is radiated by the light source unit 110 or reflected light that is reflected by a target. The optical system 2120 may perform amplification on the light radiated by the light source unit 110, and may adjust the path of the light so that the light is output to the outside of the FMCW LiDAR apparatus 2100. The optical system 2120 adjusts the path of the reflected light that is reflected by the target and then incident thereon so that the reflected light is incident on the ADC 2130.

The ADC 2130 converts, into a digital signal, the reflected light that is incident on the FMCW LiDAR apparatus 2100 via the optical system 2120. The ADCs 2130 are included to have a number corresponding to the number of channels included in the FMCW LiDAR apparatus 2100. The ADCs 2130 convert pieces of reflected light into digital signals in parallel.

The frequency conversion unit 2140 mixes channel signals having different frequencies or types with respect to the digital signals that have passed through the ADCs 2130, respectively, integrates the mixed signals into one signal, and converts the one signal into a signal in a frequency domain. The ADCs 2130 (2130a to 2130n) and the frequency conversion unit 2140 may be implemented as illustrated in FIG. 22.

Figure 22:
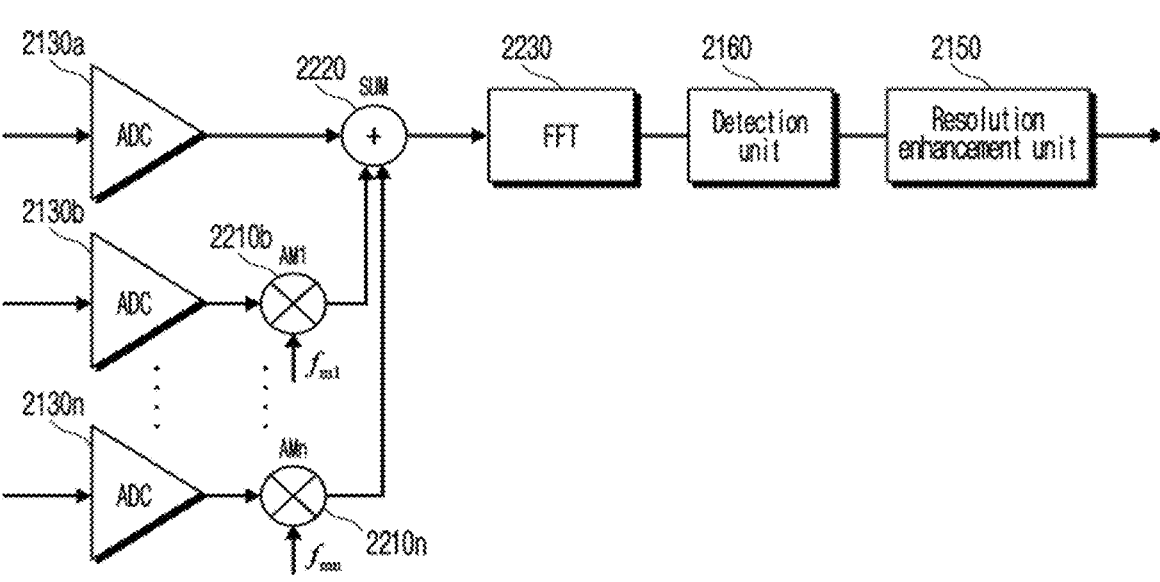
FIG. 22 is a detailed diagram illustrating components of the FMCW LiDAR apparatus according to another embodiment of the present disclosure.

FIG. 22 is a detailed diagram illustrating components of the FMCW LiDAR apparatus according to another embodiment of the present disclosure.

Referring to FIG. 22, the frequency conversion unit 2140 according to an embodiment of the present disclosure includes a modulation unit 2210 (22101 to 2210n), an adder 2220, and a fast Fourier transform (FFT) unit 2230.

As described above, the ADCs 2130a to 2130n are included to have a number corresponding to the number of channels included in the FMCW LiDAR apparatus 2100. The ADCs 2130a to 2130n receive pieces of reflected light, respectively, in parallel. An analog signal is applied to each of the ADCs 2130a to 2130n. Each of the ADCs 2130a to 2130n converts the analog signal into a digital signal. As the reflected light is converted into the digital signal, the attenuation of a signal which may occur through components or damage to a signal to noise ratio (SNR) attributable to noise is prevented. Furthermore, as the reflected light is converted into the digital signal by each of the ADCs 2130a to 2130n, when the digital signal is converted into a signal in the frequency domain through components to be described later, signals that correspond to each other may be mathematically fully the same. Accordingly, whether a signal in the frequency domain is a signal by reflected light or a signal that is generated due to noise (e.g., a signal different from a signal that is to be obtained) can be distinguished.

All of the digital signals or the remaining digital signals except one of the signals that have passed through the ADCs 2130a to 2130n are applied to the modulation units 2210b to 2210n. The modulation units 2210b to 2210n are implemented to have the same number as the number of ADCs 2130a to 2130n or implemented to have a number that is one less than the number of ADCs 2130a to 2130n. The modulation units 2210b to 2210n receive the digital signals that have passed through the ADCs 2130b to 2130n, respectively, and channel signals having different frequencies or types, and modulate the digital signals by using the channel signals. In particular, the modulation units 2210b to 2210n may perform amplitude modulation on the digital signals in modulating the digital signals.

The channel signal that is used for modulation may be implemented as $\cos(2\pi f_m)$ or $\{1+A_m \cos(2\pi f_m)\}$ As the channel signals that have been implemented as described above are applied to the modulation units 2210b to 2210n along with the digital signals, respectively, signals that are applied by the modulation units 2210b to 2210n have characteristics, such as those illustrated in FIGS. 23A, 23B, 23C, 23D, and 23E.

FIGS. 23A, 23C, 23D, 23B, and 23E are diagrams illustrating signals that have been modulated by the modulation units according to another embodiment of the present disclosure.

Figure 23A:
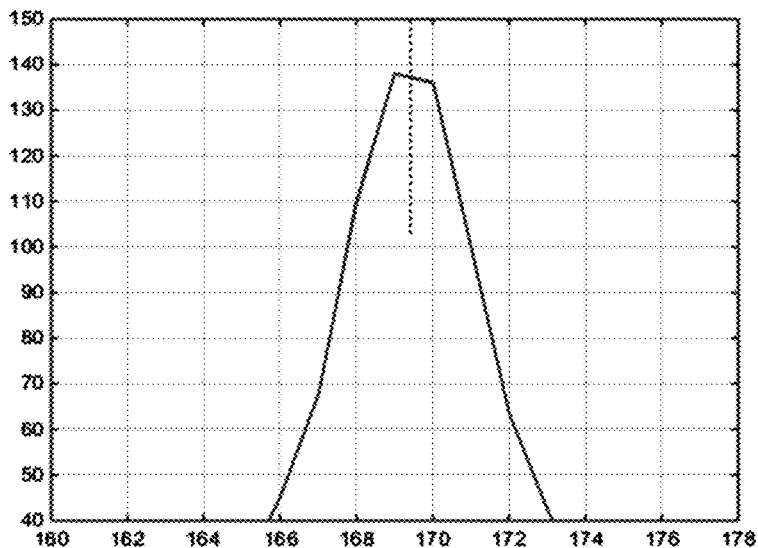
FIGS. 23A, 23B, 23C, 23D, and 23E are diagrams illustrating signals that have been modulated by modulation units according to another embodiment of the present disclosure.

FIG. 23A illustrates a digital signal that has passed through one ADC 2130. When $\{1+A_m \cos(2\pi f_m)\}$ is applied to each of the modulation units 2210b to 2210n as a channel signal along with such a digital signal and modulation is performed, a modulation signal, such as that illustrated in FIG. 23B or 23C, is output.

Figure 23B:
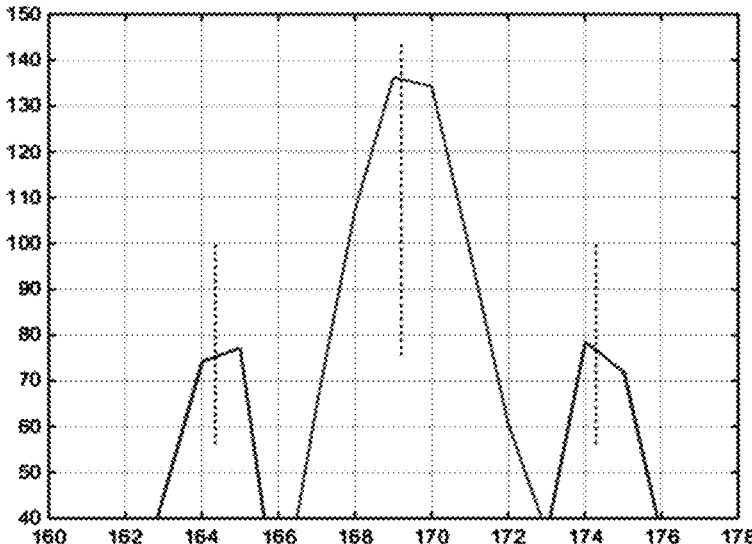
Figure 23C:
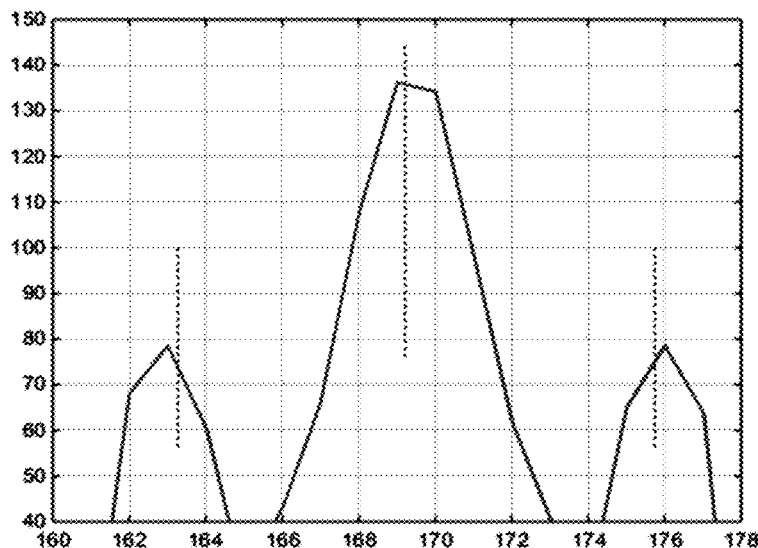

As illustrated in FIG. 23B or 23C, a signal that is modulated by the modulation unit 2210 includes additional sideband signals that each have a size relatively very smaller than the size of the original digital signal, along with the digital signal applied, and that are disposed at both ends of the digital signal, which are spaced apart from the digital signal by the frequency of a channel signal. In this case, the amount of the sideband signal that has been spaced apart from the digital signal may be differently adjusted based on the frequency of the channel signal. Furthermore, as the digital signal converted by the ADC 2130 is applied to the modulation unit 2210 as described above, the sideband signals have wholly the same characteristic in the state in which the sideband signals are mathematically symmetrical to each other.

Figure 23D:
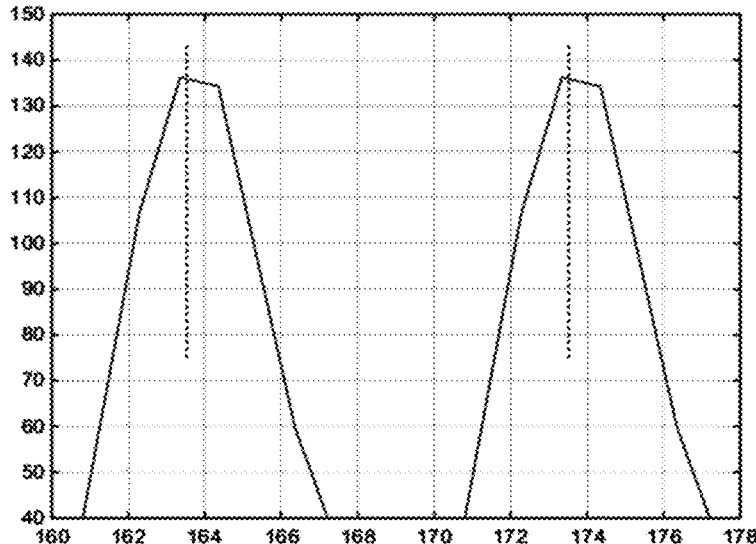
Figure 23E:
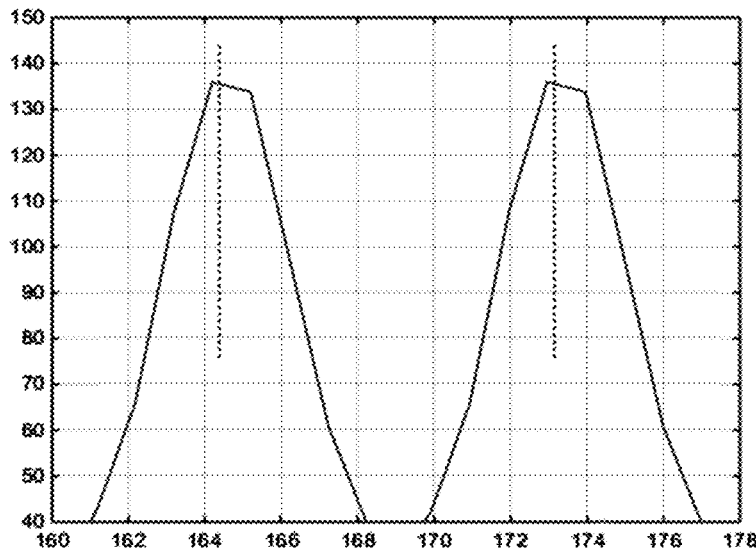

If $\cos(2\pi f_m)$ is applied to the modulation units 2210b to 2210n as the channel signal along with the digital signal and modulation is performed, a modulation signal, such as that illustrated in FIG. 23D or 23E, is output.

As illustrated in FIG. 23D or 23E, a signal that is modulated by the modulation unit 2210 includes additional sideband signals at both ends of a digital signal, which are spaced apart from the digital signal by the frequency of a channel signal, but the size of the sideband signal is implemented to be the same as the size of the original digital signal. In this case, the amount of the sideband signal that has been spaced apart from the digital signal may be differently adjusted based on the frequency of the channel signal. Both the sideband signals have wholly the same characteristic in the state in which the sideband signals are mathematically symmetrical to each other.

Referring back to FIG. 22, due to such a characteristic, if the type and frequency of a channel signal that is applied to the modulation unit 2210 becomes different, the characteristic of a modulated by each modulation unit 2210 becomes different. Furthermore, if an interval between the frequencies of channel signals is sufficiently great, at least several signals to tens of signals may be distinguished from one another although the signals are mixed.

The adder 2220 receives (one) digital signal that has passed through the ADC 2130a and the signals modulated by the modulation units 2210b to 2210n, respectively, and integrates (or adds) the received signals. The modulated signals are integrated into one signal through the adder 2220.

The FFT unit 2230 converts, into a signal in the frequency domain, the one signal that has been integrated through the adder 2220. The signal that is applied to the FFT unit 2230 and a signal that is output therefrom are illustrated in FIG. 24.

Figure 24:
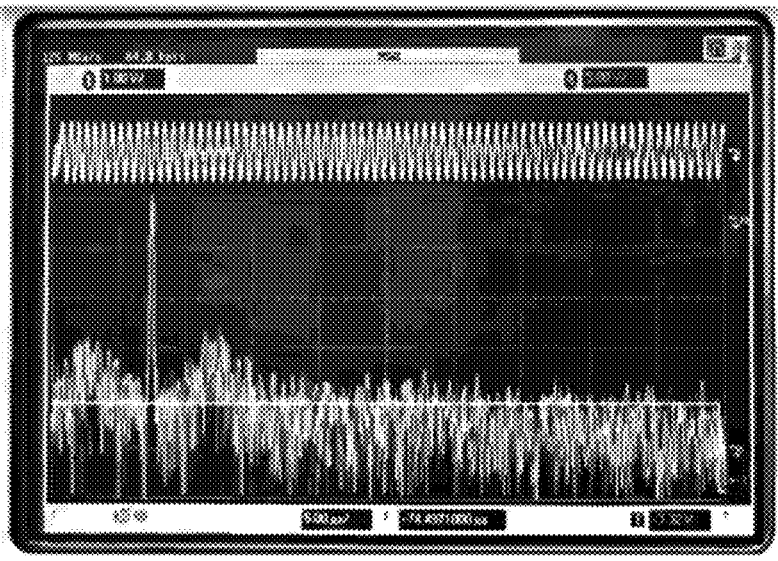
FIG. 24 is a graph illustrating signals in a time domain and a frequency domain, which are received by the FMCW LiDAR apparatus according to another embodiment of the present disclosure.

FIG. 24 is a graph illustrating signals in the time domain and the frequency domain, which are received by the FMCW LiDAR apparatus according to another embodiment of the present disclosure.

When a signal in the time domain is applied to the FFT unit 2230 as illustrated in the upper part of FIG. 24, a signal that has been converted into a signal in the frequency domain is output by the FFT unit 2230 as illustrated in the lower part of FIG. 24.

In this case, although the FMCW LiDAR apparatus 2100 includes a plurality of channels, the throughput of data to be converted into data in the frequency domain by the FFT unit 2230 may be significantly reduced compared to a conventional technology because one integrated signal is applied to the FFT unit 2230. Furthermore, although one integrated signal is applied to the FFT unit 2230, signals can be wholly distinguished because the signals have different characteristics as illustrated in FIG. 23. In particular, although a signal similar to a signal that has been modulated as noise occurs is generated, noise and the modulated signal may be distinguished based on whether sideband signals that are fully the same are present at both ends of a specific signal or whether a signal that is fully the same as a specific signal is present adjacent to the specific signal.

Referring back to FIGS. 21 and 22, the resolution enhancement unit 2150 improves the resolution of detection by increasing a computational load of the frequency conversion unit 2140, in particular, the FFT unit 2230 of the frequency conversion unit 2140. The FFT unit 2230 performs a discrete operation in view of its operating characteristic. However, if the FFT unit 2230 discretely performs an operation as described above, there is concern that an arbitrary point (e.g., a peak point) may not be searched for because an operation is not performed on the arbitrary point within the frequency domain as illustrated in FIG. 24. In order to prevent such a problem, the resolution enhancement unit 2150 improves the resolution of detection by enabling the FFT unit 2230 to continuously perform operations.

The detection unit 2160 detects information on the distance of the target based on the signal converted into the signal in the frequency domain through the FFT unit 2230. A detection process of the detection unit 2160 is illustrated in FIG. 25.

Figure 25:
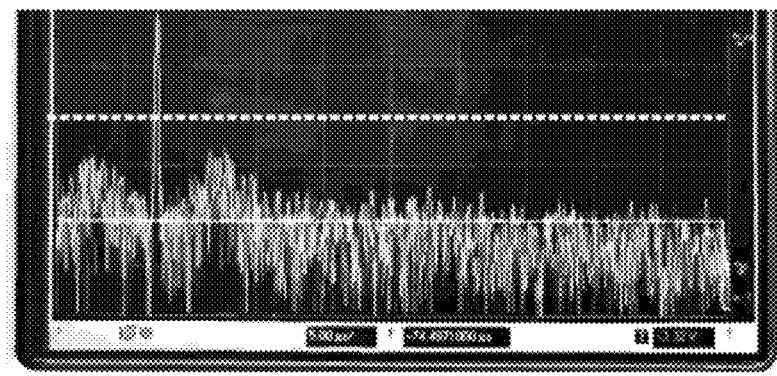
FIG. 25 is a diagram illustrating a process of detecting a target according to another embodiment of the present disclosure.

FIG. 25 is a diagram illustrating a process of detecting a target according to another embodiment of the present disclosure.

As illustrated in FIG. 25, the detection unit 2160 determines whether a portion having intensity that is greater than a preset reference value within a signal converted into a signal in the frequency domain is present. The detection unit 2160 determines that a target is present in the portion having the intensity that is greater than the preset reference value within the corresponding signal, and determines that the target is not present in a portion having intensity that is not greater than the preset reference value within the corresponding signal.

Through such a process, the FMCW LiDAR apparatus 2100 can minimize a computational load of the FFT unit although the FMCW LiDAR apparatus includes a plurality of channels. Accordingly, the problem that has been described in the technology that is the background of the present disclosure can be solved.

Figure 26:
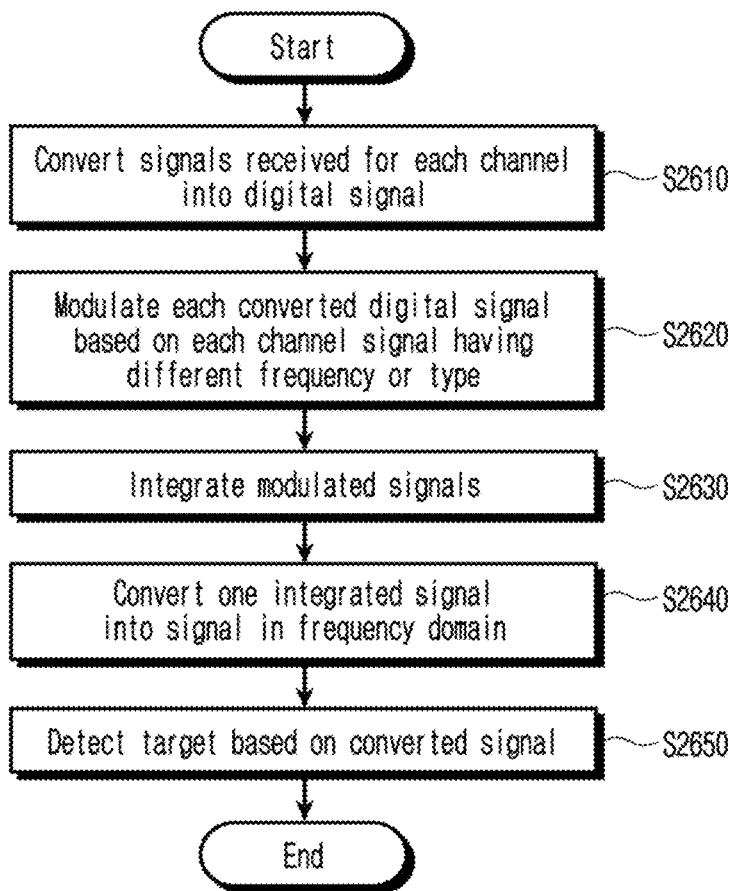
FIG. 26 is a flowchart illustrating an operating method of the FMCW LiDAR apparatus according to another embodiment of the present disclosure.

FIG. 26 is a flowchart illustrating an operating method of the FMCW LiDAR apparatus according to another embodiment of the present disclosure.

The ADCs 2130 convert signals that are received from channels into digital signals, respectively (S2610).

The modulation unit 2210 modulates the converted digital signals by using channel signals having different frequencies or types (S2620).

The adder 2220 integrates the modulated signals into one signal (S2630).

The FFT unit 2230 converts the integrated one signal into a signal in the frequency domain (S2640).

The detection unit 2160 detects information on the distance of a target based on the converted signal (S2650).

The processes in FIG. 26 have been described as being sequentially executed, but this merely illustrates the technology spirit of an embodiment of the present disclosure. In other words, a person having ordinary knowledge in the art to which an embodiment of the present disclosure pertains may variously modify and change the processes by changing and executing the sequence described in FIG. 26 or executing one or more of the processes in parallel within a range that does not deviate from the intrinsic characteristic of an embodiment of the present disclosure. Accordingly, FIG. 26 is not limited to a time-series sequence.

The processes illustrated in FIG. 26 may be implemented in a computer-readable recording medium in the form of a computer-readable code. The computer-readable recording medium includes all types of recording devices in which data readable by a computer system is stored. That is, the computer-readable recording medium includes storage media, such as magnetic storage media (e.g., ROM, a floppy disk, and a hard disk) and optical reading media (e.g., CD-ROM and a DVD). Furthermore, the computer-readable recording medium may be distributed to computer systems connected over a network, and the computer-readable code may be stored and executed in a distributed manner.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. A LiDAR apparatus which comprises a plurality of channels and measures information on a distance of a target by receiving light reflected by the target after radiating light to the target, the LiDAR apparatus comprising:

a plurality of analog-to-digital converts (ADCs) each configured to receive the reflected light reflected by the target and to convert the reflected target signal into a digital signal;

one or more modulation units configured to receive the digital signals that have passed through some or all of the ADCs and channel signals having different frequencies or types and to perform amplitude modulation on the digital signals;

an adder configured to integrate the signals that have been modulated and received from the modulation units;

a fast Fourier transform (FFT) unit configured to convert one signal integrated by the adder into a signal in a frequency domain; and a detection unit configured to detect the information on the distance of the target based on the signal converted into the signal in the frequency domain through the FFT unit, wherein a channel signal that is used for modulation by the one or more modulation units is implemented $\cos(2\pi f_m)$ or $\{1+A_m \cos(2\pi f_m)\}$, the $A_m$ is a modulated amplitude, and the $f_m$ is a modulated frequency, and wherein a signal that is modulated by the one or more modulation units includes an original digital signal applied and additional sideband signals each of which has a amplitude relatively smaller than an amplitude of an original digital signal and that are disposed at both ends of the digital signal, which are spaced apart from the original digital signal by a frequency of a channel signal, or includes additional sideband signals that are disposed at both ends of the digital signal, which are spaced apart from the original digital signal by the frequency of the channel signal and each of which has an amplitude the same as the amplitude of the original digital signal.

2. The LiDAR apparatus of claim 1, wherein each of the plurality of ADCs is included to have a number corresponding to a number of channels included in the LiDAR apparatus.

3. The LiDAR apparatus of claim 1, wherein the modulation units are included to have a number identical with a number of ADCs or are included to have a number that is one less than the number of ADCs.

4. A method of a LiDAR apparatus comprising a plurality of channels operating in order to measure information on a distance of a target by receiving light reflected by the target after radiating light to the target, the method comprising:

a first conversion process of converting, into a digital signal, reflected light that is applied for each channel;

a modulation process of receiving the digital signals that have undergone the first conversion process and channel signals having different frequencies or types and performing amplitude modulation on the digital signals;

an integration process of receiving and integrating the signals modulated in the modulation process;

a second conversion process of converting one signal that has been integrated in the integration process into a signal in a frequency domain; and a detection process of detecting the information on the distance of the target based on the signal converted into the signal in the frequency domain through the second conversion process, wherein a channel signal that is used for modulation by one or more modulation units is implemented as $\cos(2\pi f_m)$ or $\{1+A_m \cos(2\pi f_m)\}$, the $A_m$ is a modulated amplitude, and the $f_m$ is a modulated frequency, and wherein a signal that is modulated by the one or more modulation units includes additional sideband signals each of which has an amplitude relatively smaller than an amplitude of an amplitude of an original digital signal, along with a digital signal applied, and that are disposed at both ends of the digital signal, which are spaced apart from the original digital signal by a frequency of a channel signal, or includes additional sideband signals that are disposed at both ends of the digital signal, which are spaced apart from the original digital signal by the frequency of the channel signal, and each of which has an amplitude the same as an amplitude of the original digital signal.

5. The method of claim 4, wherein the first conversion process is performed in parallel by a number of channels included in the LiDAR apparatus.

\* \* \* \* \*